(12) United States Patent
Amagasa

(10) Patent No.: US 6,288,509 B1
(45) Date of Patent: Sep. 11, 2001

(54) METHOD FOR CONTROLLING AN OPPOSED WIPING TYPE WIPER APPARATUS AND AN OPPOSED WIPING TYPE WIPER APPARATUS

(75) Inventor: Toshiyuki Amagasa, Ota (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 09/290,928

(22) Filed: Apr. 13, 1999

(30) Foreign Application Priority Data

Apr. 22, 1998 (JP) .................................................. 10-111897
Apr. 22, 1998 (JP) .................................................. 10-111900
Apr. 22, 1998 (JP) .................................................. 10-111901
Apr. 22, 1998 (JP) .................................................. 10-111902

(51) Int. Cl.$^7$ ................................. B60S 1/08; H02P 5/52
(52) U.S. Cl. .................................... 318/443; 318/DIG. 2; 318/54; 318/102; 318/41; 15/250.14; 15/250.12; 15/250.27
(58) Field of Search .................. 15/250.001, 250.12, 15/250.17, 250.16, 250.27, 250.14; 318/443, 444, 41, DIG. 2, 34, 37, 101, 53, 62, 102, 54

(56) References Cited

U.S. PATENT DOCUMENTS

| | | | |
|---|---|---|---|
| 4,431,954 | * | 2/1984 | Carpenter et al. ................... 318/443 |
| 4,585,980 | * | 4/1986 | Gille et al. ....................... 318/DIG. 2 |
| 4,665,488 | * | 5/1987 | Graham et al. ................. 318/DIG. 2 |
| 4,670,695 | * | 6/1987 | Licata et al. .................... 318/DIG. 2 |
| 4,900,995 | * | 2/1990 | Wainwright ..................... 318/DIG. 2 |
| 4,900,996 | * | 2/1990 | Wainwright ..................... 318/DIG. 2 |
| 5,157,314 | * | 10/1992 | Kuhbauch ....................... 318/DIG. 2 |
| 5,256,950 | * | 10/1993 | Matsumoto et al. ............. 318/DIG. 2 |
| 5,568,026 | * | 10/1996 | Welch ............................ 318/DIG. 2 |
| 6,157,154 | * | 12/2000 | Amagasa ........................ 318/DIG. 2 |

* cited by examiner

*Primary Examiner*—Gary K. Graham
(74) *Attorney, Agent, or Firm*—McCormick, Paulding & Huber LLP

(57) ABSTRACT

In an opposed wiping type wiper apparatus, left and right wiper blades which perform wiping operations with a predetermined preceding-following relationship maintained are layered vertically at their lower returning positions. A wiper drive control unit controls preceding-following relationships between the left and right wiper blades to prevent locking and stopping of the wiper blades when the relationship has changed by replacing left and right control forms for the blades. When the timer of the wiper blade which is to be in the follower side during normal operation is not reset but overflows among timers which are respectively reset pulse signals generated in accordance with rotations of motors, the output of the motor which drives the wiper blade which is to be in the follower side during normal operations is increased. In this manner, the wiper blades are prevented from being locked even in case where the preceding-following relationship between the wiper blades is changed without causing changes of position angles. The control unit also acts to operate both preceding and following wiper blades if the preceding side stops for a predetermined time or more within a common overlap region. Thus, the outputs from two motors is applied to the wiper blades to overcome a load applied to the wiper blades.

7 Claims, 13 Drawing Sheets

| | | reference for DR-side control | | | | reference for AS-side control | | |
|---|---|---|---|---|---|---|---|---|
| DR | AS | distance | adjustment value (period) | target velocity (period) | AS | DR | distance | adjustment value (period) | target velocity (period) |
| 0 | 0 | 0 | 0 | 4340 | 0 | 0 | 0 | 0 | 4340 |
| 1 | 1 | 0 | -723 | 3617 | 1 | 2 | -1 | 2170 | 6510 |
| 2 | 1 | 1 | -724 | 2893 | 2 | 4 | -2 | 0 | 6510 |
| 3 | 1 | 2 | -723 | 2170 | 3 | 6 | -3 | 0 | 6510 |
| 4 | 2 | 2 | 723 | 2893 | 4 | 8 | -4 | 0 | 6510 |
| 5 | 2 | 3 | 724 | 3617 | 5 | 10 | -5 | 0 | 6510 |
| 6 | 3 | 3 | -241 | 3376 | 6 | 12 | -6 | 0 | 6510 |
| 7 | 3 | 4 | -242 | 3134 | 7 | 14 | -7 | 0 | 6510 |
| 8 | 4 | 4 | 81 | 3215 | 8 | 16 | -8 | 0 | 6510 |
| 9 | 4 | 5 | 80 | 3295 | 9 | 18 | -9 | 0 | 6510 |
| 10 | 5 | 5 | -27 | 3268 | 10 | 20 | -10 | 0 | 6510 |
| 11 | 5 | 6 | -26 | 3242 | 11 | 21 | -11 | -723 | 5787 |
| 12 | 6 | 6 | 9 | 3251 | 12 | 23 | -11 | -724 | 5063 |
| 13 | 6 | 7 | 8 | 3259 | 13 | 24 | -12 | 241 | 5304 |
| 14 | 7 | 7 | -3 | 3256 | 14 | 26 | -12 | 242 | 5546 |
| 15 | 7 | 8 | -2 | 3254 | 15 | 27 | -13 | -81 | 5465 |
| 16 | 8 | 8 | 1 | 3255 | 16 | 29 | -13 | -80 | 5385 |
| 17 | 8 | 9 | 0 | 3255 | 17 | 30 | -14 | 27 | 5412 |
| 18 | 9 | 9 | 181 | 3436 | 18 | 32 | -14 | 26 | 5438 |
| 19 | 9 | 9 | 181 | 3617 | 19 | 33 | -15 | -9 | 5429 |
| 20 | 10 | 10 | 180 | 3797 | 20 | 35 | -15 | -8 | 5421 |
| 21 | 10 | 10 | 361 | 3436 | 21 | 36 | -15 | 3 | 5424 |
| 22 | 11 | 11 | -362 | 3074 | 22 | 38 | -16 | 2 | 5426 |
| 23 | 12 | 11 | 271 | 3345 | 23 | 39 | -16 | -1 | 5425 |
| 24 | 13 | 11 | 272 | 3617 | 24 | 41 | -17 | 0 | 5425 |
| 25 | 13 | 12 | 271 | 3888 | 25 | 42 | -17 | -181 | 5244 |

| angular position (pulse count) | | angular distance AS-DR |
|---|---|---|
| AS | DR | |
| 0 | 0 | 0 |
| 1 | 2 | -1 |
| 2 | 4 | -2 |
| 3 | 6 | -3 |
| 4 | 8 | -4 |
| 5 | 10 | -5 |
| 6 | 12 | -6 |
| 7 | 14 | -7 |
| 8 | 16 | -8 |
| 9 | 18 | -9 |
| 10 | 20 | -10 |
| 11 | 21 | -10 |
| 12 | 23 | -11 |
| 13 | 24 | -11 |
| 14 | 26 | -12 |
| 15 | 27 | -12 |
| 16 | 29 | -13 |
| 17 | 30 | -13 |
| 18 | 32 | -14 |
| 19 | 33 | -14 |
| 20 | 35 | -15 |
| 21 | 36 | -15 |
| 22 | 38 | -16 |
| 23 | 39 | -16 |
| 24 | 41 | -17 |
| 25 | 42 | -17 |
| 26 | 43 | -17 |
| 27 | 45 | -18 |
| 28 | 46 | -18 |
| 29 | 47 | -18 |
| 30 | 48 | -18 |

Fig.13
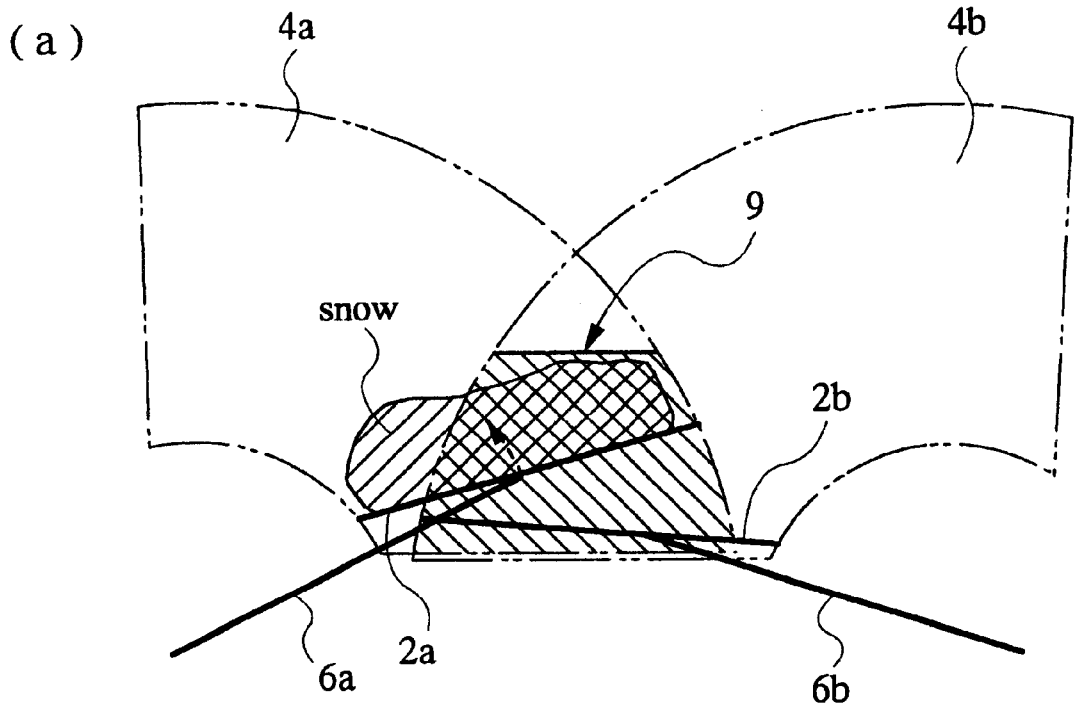
(a)
snow
2a, 2b : wiper blade
4a, 4b : wiping area
9 : overlap area
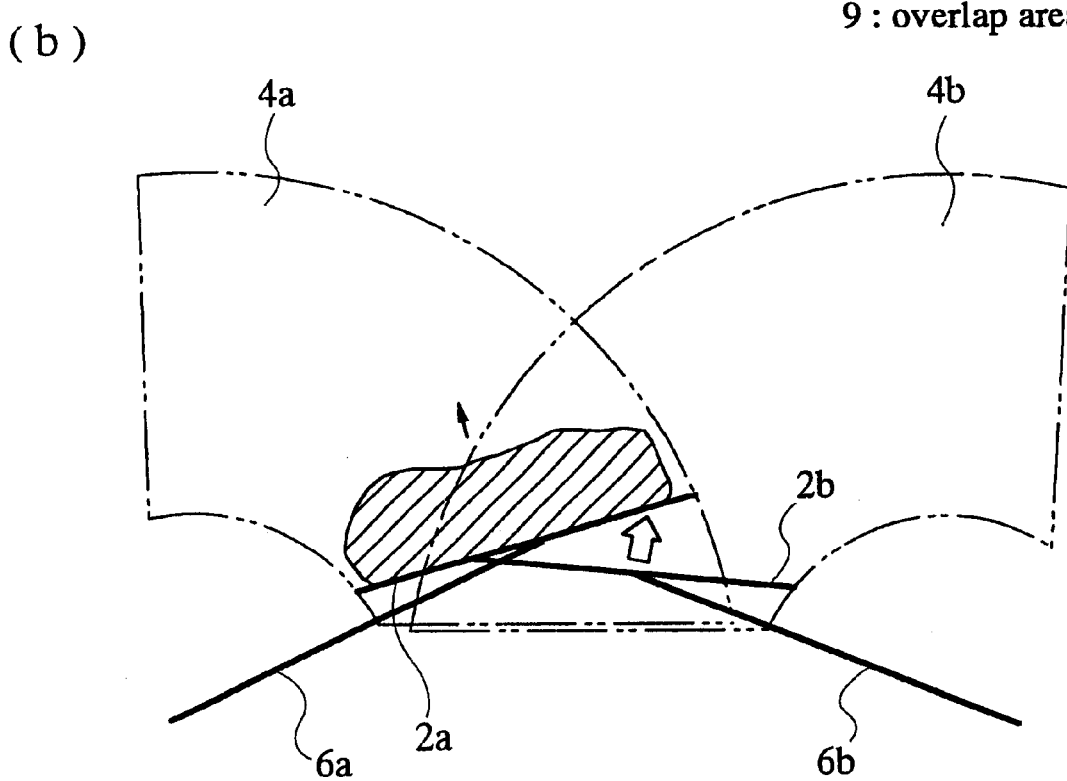
(b)

METHOD FOR CONTROLLING AN OPPOSED WIPING TYPE WIPER APPARATUS AND AN OPPOSED WIPING TYPE WIPER APPARATUS

BACKGROUND OF THE INVENTION

1. Field of the Invention

The present invention relates to a technology for controlling a wiper apparatus for use ir a vehicle, and more particularly to a technology advantageously applied to a wiper apparatus in which a pair of wiper blades move in an opposing fashion.

2. Related Art Statement

There are two types of controlling manners in wiper blades. One of them is a parallel type in which a pair of wiper blades are driven while keeping substantially equidistant position between the blades. The other of them is an opposing type in which the pair of wiper blades are controlled to move in an opposing fashion. That is, when one of the blades moves to the center of the front glass the other of the wiper blades also moves to the center of the front glass while one moves away from the center the other is also moves away from the center. In a wiper apparatus of the opposed wiping type, rotation centers of wiper arms are respectively positioned at left and right ends of the front glass and wiper blades move from both sides of the front glass toward the center thereof.

The wiper apparatus of the opposed wiping type may have an arrangement in which a wiper driving motor is provided at the center of the vehicle and left and right wiper blades are driven in the opposing fashion as set forth above by means of a link mechanism.

However, if only one motor is employed for driving the pair of wiper blades, the drive mechanism shall have a width equal to the whole width of a vehicle for transmitting mechanical motion from the motor to both of the wiper blades. Thus, it is inevitable that the mechanism shall have a large scale and weight. If it is requested to make the mechanism small and compact, two motors may be employed for driving the left and right wiper blades.

However, if the mechanism employs two motors for driving the left and right wiper blades, respectively, the mechanism can suffer from asynchronous motions in both of the wiper blades. The asynchronous motion is caused from difference in motor drive characteristics between the left and right motors or the motor rotational rate variations due to lord imposed on the motors.

In order to avoid the above-described asynchronous motion between the left and right motors and resulting wiper motion conflict, it is a possible way to regulate the two wiper blades in such a manner that angular positions of respective wiper blades are detected and each one of the wiper blades is controlled based on its angular position relative to the other. In other words, one wiper blade is controlled so as to keep certain distance relative to the other.

However, this manner of control presupposes that the predetermined preceding-following relationship between the wiper blades are kept constantly.

Incidentally, one of the essential requirement for a wiper apparatus is to widen the wiping area to improve the view angle and view area through which a driver of a vehicle can obtain in the horizontal direction.

It is general for the wiper apparatus of the opposing type to have an arrangement in which the wiping areas of the left and right wiper blades are normally overlapped at the center portion, or a lower return position of the front glass, so as to enlarge the whole wiping area. If the wiper apparatus is made to have such arrangement, the apparatus is more stringently required to avoid the interference in motion between the pair of blades due to the asynchronous motion of the blades. Accordingly, the motors employed in the apparatus thus arranged are more stringently requested to have equal characteristics and the load variation shall be subjected to more stringent control for eliminating the interference.

Suppose that the wiper motions are controlled on the angular distance relative to the other and the wiping areas of respective wiper blades are arranged to have an overlapping area. If the preceding-following relationship between the driver's side (hereinafter referred to as DR-side) wiper blade and the assistant's side (hereinafter referred to as AS-side) wiper blade is not maintained due to any external force or the like and the wiper apparatus is still trying to recover the predetermined preceding-following relationship on the wiper blades, then the wiper blade, which shall be on the preceding side in terms of the predetermined relationship, will try to go ahead relative to the other and the wiper blade, which shall be on the following side in terms of the predetermined relationship, will try to return behind the other. The motion of the wiper blades lead to collision with each other, resulting in locking mode of the wiper apparatus stops. Consequently, if the original preceding-following relationship between the wiper blades is to be recovered, the user shall move the wiper blade manually to resume the wiping operation. In this respect, improvements have been expected.

Also, there is a case that the wiper blades are brought into contact with each other due to some factors during operation of the wiper apparatus. In this case, the system may be broken if electric conductance is continuously maintained. Therefore, electric conductance is cut off to stop the motors upon elapse of a predetermined time after the blades are locked, and the system is thus protected.

Here, the wiper blades are locked in such a case in which the relationship between the wiper blades as the preceding side and the follower side is changed due to any external force, in addition to a case of existence of an obstacle such as snow and the like. According to the control based on the positional angular distance as described above, if the relationship between the preceding side and the follower side is changed between the DR-side and the AS-side, the follower side overtakes the preceding side to maintain a normal positional angular distance, regardless of their relationship changed. That is, based on the positional angular distance between both blades, the output of the side of the blade which has overtaken is decreased and the output of the side of the other blade which has been overtaken is increased so as to return the positional angular distance to a predetermined value. Therefore, the blade which has overtaken is caught up with by the blade which has been overtaken so that both blades are brought into contact with each other. In this state, the side of the blade which has been overtaken further behaves to overtake the blade which has overtaken, and both blades are therefore locked in contact with each other.

Incidentally, suppose that each of the wiper blades is controlled based on the angular distance relative to the other and the wiper arms of the respective wiper blades are bent due to some external force in the wipe-up process, for example, with the result that positional relationship of the wiper arm, or the proximal end portion of the wiper arm, is maintained in the predetermined preceding-following relationship in spite of the fact that the actual positional relationship of the wiper blades, or distal end portion of the wiper arm, are exchanged therebetween. At this time, the preceding-following relationship between both of the blades is determined as being normal according to the control method as described above, and the replacement of the control forms as described above is not carried out. Accordingly, the locking state cannot be eliminated and also cannot be distinguished from the locking state which is caused by an obstacle, so that the motors must be stopped to turn down the system as a countermeasure.

Further, if there is snow covering the front glass, the load of the snow is almost applied to the wiper blade situated at an upper position. However, in the control system based on the positional angular distance as described above, the wiper blades tend to move with an angle difference maintained between each other, and therefore, it is possible to respond to this kind of load within the output range of only one motor. For example, when the wiper apparatus is started, only the wiper blade in the upper side operate, and therefore, it is possible to respond to the load of covering snow only within the motor output range of the upper wiper blade. In particular, in an apparatus employing a four-joint link mechanism and wiper blades are driven by the four-joint link mechanism, a large torque cannot be outputted at starting due to the nature of the four-joint link mechanism and the structure is thus weak against the load at starting. Therefore, improvements have been expected.

SUMMARY OF THE INVENTION

A general object of the present invention is to provide a method for controlling an opposed wiping type wiper apparatus having first and second wiper blades driven by respective driving means, each wiper blade being controlled so that wiping areas of the respective wiper blades contain area overlapping with each other.

Another object of the present invention is to propose a method for controlling a wiper apparatus in which the wiper blades can be prevented from being brought into locking mode even if a predetermined preceding-following relationship between the left and right wiper blades is not maintained.

Another object of the present invention is to propose a method for controlling a wiper apparatus in which even if the wiper apparatus is brought into a locking mode, the cause thereof is positively determined and a countermeasure therefor is positively taken.

Still another object of the present invention is to propose a method for controlling a wiper apparatus in which if one of the wiper blades is prevented from being moved due to a load applied thereto, the other of the wiper blades is effectively driven to remove the load.

According to one aspect of the present invention, there is proposed a method for controlling an opposed wiping type wiper apparatus having first and second wiper blades driven by respective driving means, each wiper blade being controlled so that wiping areas of the respective wiper blades contain area overlapping with each other and that each one wiper blade is controlled based on its angular distance relative to the other, the method comprising the steps of preparing data indicative of desired preceding-following relationship for every necessary angular position taken by each of the wiper blades, detecting the angular position of each of the wiper blades, calculating the angular distance of each one of the wiper blades relative to the other, determining which one of the wiper blades is preceding relative to the other, determining whether or not the determined preceding-following relationship is same as the desired preceding-following relationship, and controlling the first and second wiper blades based on the determined result on the preceding-following relationship.

According to the above invention, the positional relationship between the wiper blades is determined on whether or not the determined preceding-following relationship is same as the desired preceding-following relationship, and control can be carried out based on the determined result.

According to another aspect of the present invention, there is proposed a method for controlling an opposed wiping type wiper apparatus having first and second wiper blades driven by respective driving means, each wiper blade being controlled so that wiping areas of the respective wiper blades contain area overlapping with each other and that each one wiper blade is controlled based on its angular distance relative to the other, the method comprising the steps of preparing data indicative of desired preceding-following relationship for every necessary angular position taken by each of the wiper blades, detecting the angular position of each of the wiper blades, calculating the angular distance of each one of the wiper blades relative to the other, determining which one of the wiper blades is preceding relative to the other, determining whether or not the determined preceding-following relationship is same as the desired preceding-following relationship, and controlling the first wiper blade based on the angular distance of the second wiper blade relative to the first wiper blade while the second wiper blade based on the angular distance of the first wiper blade relative to the second wiper blade if the determined preceding-following relationship is different from the desired preceding-following relationship.

According to the above invention, if it is determined that the preceding-following relationship of the wiper blades is different from the desired preceding-following relationship, the first wiper blade is controlled based on the angular distance of the second wiper blade relative to the first wiper blade while the second wiper blade is controlled based on the angular distance of the first wiper blade relative to the second wiper blade, whereby the wiper blades can be released from the locking mode.

According to another aspect of the present invention, there is proposed a method for controlling an opposed wiping type wiper apparatus having first and second wiper blades driven by first and second motors, respectively, each wiper blade being controlled so that wiping areas of the respective wiper blades contain area overlapping with each other and that first and second wiper blades are controlled by supplying control data based on the angular distance of each one wiper blade relative to the other to the corresponding motor, the method comprising the steps of preparing data indicative of desired preceding-following relationship for every necessary angular position taken by each of the wiper blades, detecting the angular position of each of the wiper blades, calculating the angular distance of each one of the wiper blades relative to the other, determining which one of the wiper blades is preceding relative to the other, determining whether or not the determined preceding-following relationship is same as the desired preceding-following relationship, and controlling the first wiper blade by supplying control data based on the angular distance of the second wiper blade relative to the first wiper blade to the first motor while the second wiper blade by supplying control data based on the angular distance of the first wiper blade relative to the second wiper blade to the second motor if the determined preceding-following relationship is different from the desired preceding-following relationship.

According to the above invention, when it is determined that the preceding-following relationship of the wiper blades is different from the desired preceding-following relationship, the first wiper blade is controlled by supplying control data based on the angular distance of the second wiper blade relative to the first wiper blade to the first motor while the second wiper blade is controlled by supplying control data based on the angular distance of the first wiper blade relative to the second wiper blade to the second motor, whereby the wiper blades can be released from the locking mode.

According to another aspect of the present invention, there is proposed a method for controlling an opposed wiping type wiper apparatus having first and second wiper blades driven by respective motors, each wiper blade being controlled so that wiping areas of the respective wiper blades contain area overlapping with each other and that each one wiper blade is controlled based on a predetermined preceding-following relationship between the wiper blades, the method comprising the steps of, energizing the motor of the wiper blade which shall be on the following side in terms of the predetermined preceding-following relationship to move the wiper blade in the direction from the following side to the preceding side when the wiper blades cease motion upon driving mode of the wiper apparatus, energizing the motor of the wiper blade which shall be on the preceding side in terms of the predetermined preceding-following relationship to move the wiper blade in the direction from the following side to the preceding side, detecting whether the wiper blade which shall be on the preceding side in terms of the predetermined preceding-following relationship is moved or not, and controlling the first and second wiper blades based on a preceding-following relationship in which roles of the first and second wiper blades are exchanged with each other if the wiper blade which shall be on the preceding side in terms of the predetermined preceding-following relationship is moved.

According to the above invention, when the preceding-following relationship of the wiper blades becomes different from the predetermined preceding-following relationship with the result that the wiper apparatus is brought into a locking mode, the first and second wiper blades are controlled based on a preceding-following relationship in which roles of the first and second wiper blades are exchanged with each other, whereby the wiper blades can be released from the locking mode.

According to another aspect of the present invention, there is proposed a method for controlling an opposed wiping type wiper apparatus having first and second wiper blades driven by respective motors, each wiper blade being controlled so that wiping areas of the respective wiper blades contain area overlapping with each other and that each one wiper blade is controlled based on a predetermined preceding-following relationship between the wiper blades, wherein if the wiper blade which shall be on the preceding side in terms of the predetermined preceding-following relationship ceases to operate for a predetermined time duration within a range where wiping areas of the wiper blades overlap each other, then the wiper blade on the follower side is driven to urge the wiper blade on the preceding side upward.

According to the above invention, if one of the wiper blades is prevented from being moved due to a load applied thereto, the other of the wiper blades is effectively driven together with the one wiper blade to remove the load.

According to another aspect of the present invention, there is provided an opposed wiping type wiper apparatus having first and second wiper blades driven by respective driving means, each wiper blade being controlled so that wiping areas of the respective wiper blades contain area overlapping with each other and that each one wiper blade is controlled based on its angular distance relative to the other, the apparatus comprising memory means for memorizing therein data indicative of a desired preceding-following relationship for every necessary angular position taken by each of the wiper blades, detecting means for detecting the angular position of each of the wiper blades, calculation means for calculating the angular distance of each one of the wiper blades relative to the other, first determining means for determining which one of the wiper blades is preceding relative to the other, second determining means for determining whether or not the determined preceding-following relationship is same as the desired preceding-following relationship, and control means for controlling the first and second wiper blades based on the compared result on the preceding-following relationship.

According to the above invention, the positional relationship between the wiper blades is determined on whether or not the determined preceding-following relationship is same as the desired preceding-following relationship, and control can be carried out based on the determined result.

According to another aspect of the present invention, there is provided an opposed wiping type wiper apparatus having first and second wiper blades driven by respective driving means, each wiper blade being controlled so that wiping areas of the respective wiper blades contain area overlapping with each other and that each one wiper blade is controlled based on its angular distance relative to the other, the apparatus comprising memory means for memorizing data indicative of a desired preceding-following relationship for every necessary angular position taken by each of the wiper blades, detecting means for detecting the angular position of each of the wiper blades, calculation means for calculating the angular distance of each one of the wiper blades relative to the other, first determining means for determining which one of the wiper blades is preceding relative to the other, second determining means for determining whether or not the determined preceding-following relationship is same as the desired preceding-following relationship, and control means for controlling the first wiper blade based on the angular distance of the second wiper blade relative to the first wiper blade while the second wiper blade based on the angular distance of the first wiper blade relative to the second wiper blade if the determined preceding-following relationship is different from the desired preceding-following relationship.

According to the above invention, if it is determined that the preceding-following relationship of the wiper blades is different from the desired preceding-following relationship, the first wiper blade is controlled based on the angular distance of the second wiper blade relative to the first wiper blade while the second wiper blade is controlled based on the angular distance of the first wiper blade relative to the second wiper blade, whereby the wiper blades can be released from the locking mode.

According to another aspect of the present invention, there is provided an opposed wiping type wiper apparatus having first and second wiper blades driven by first and second motors, respectively, each wiper blade being controlled so that wiping areas of the respective wiper blades contain area overlapping with each other and that first and second wiper blades are controlled by supplying control data based on the angular distance of each one wiper blade relative to the other to the corresponding motor, the apparatus comprising memory means for memorizing therein data indicative of desired preceding-following relationship for every necessary angular position taken by each of the wiper blades, detecting means for detecting the angular position of each of the wiper blades, calculation means for calculating the angular distance of each one of the wiper blades relative to the other, first determining means for determining which one of the wiper blades is preceding relative to the other, second determining means for determining whether or not the determined preceding-following relationship is same as the desired preceding-following relationship, and control means for controlling the first wiper blade by supplying control data based on the angular distance of the second wiper blade relative to the first wiper blade while the second wiper blade by supplying control data based on the angular distance of the first wiper blade relative to the second wiper blade if the determined preceding-following relationship is different from the desired preceding-following relationship.

According to the above invention, when it is determined that the preceding-following relationship of the wiper blades is different from the desired preceding-following relationship, the first wiper blade is controlled by supplying control data based on the angular distance of the second wiper blade relative to the first wiper blade to the first motor while the second wiper blade is controlled by supplying control data based on the angular distance of the first wiper blade relative to the second wiper blade to the second motor, whereby the wiper blades can be released from the locking mode.

According to another aspect of the present invention, there is provided an opposed wiping type wiper apparatus having first and second wiper blades driven by respective motors, each wiper blade being controlled so that wiping areas of the respective wiper blades contain area overlapping with each other and that each one wiper blade is controlled based on a predetermined preceding-following relationship between the wiper blades, the apparatus comprising first detecting means for detecting whether or not the wiper blades cease motion upon driving mode of the wiper apparatus, second detecting means for detecting whether or not the wiper blade which shall be on the preceding side in terms of the predetermined preceding-following relationship is moved, and control means for controlling the respective motors to control the motion of the wiper blades, wherein when the first detecting means detects the wiper blades cease motion upon driving mode of the wiper apparatus, the control means energizes the motor of the wiper blade which shall be on the following side in terms of the predetermined preceding-following relationship to move the wiper blade in the direction from the following side to the preceding side and also energizes the motor of the wiper blade which shall be on the preceding side in terms of the predetermined preceding-following relationship to move the wiper blade in the direction from the following side to the preceding side, and if the second detecting means detects that the wiper blade which shall be on the preceding side in terms of the predetermined preceding-following relationship is moved, then the control means controls the first and second wiper blades based on a preceding-following relationship in which roles of the first and second wiper blades are exchanged with each other.

According to the above invention, when the preceding-following relationship of the wiper blades becomes different from the predetermined preceding-following relationship with the result that the wiper apparatus is brought into a locking mode, the first and second wiper blades are controlled based on a preceding-following relationship in which roles of the first and second wiper blades are exchanged with each other, whereby the wiper blades can be released from the locking mode.

According to still another aspect of the present invention, there is provided an opposed wiping type wiper apparatus having first and second wiper blades driven by respective motors, each wiper blade being controlled so that wiping areas of the respective wiper blades contain area overlapping with each other and that each one wiper blade is controlled based on a predetermined preceding-following relationship between the wiper blades, the apparatus comprising first detecting means for detecting whether or not the wiper blades cease motion upon driving mode of the wiper apparatus, second detecting means for detecting whether or not the wiper blades lie in the area in which the wiping areas of the respective wiper blades overlap with each other, and control means for controlling the respective motors to control the motion of the wiper blades, wherein if the first detecting means detects that the wiper blade which shall be on the preceding side in terms of the predetermined preceding-following relationship ceases to operate for a predetermined time duration and the second detecting means detects that the wiper blades lie in the area in which the wiping areas of the respective wiper blades overlap with each other, then the control means energizes the wiper blade on the follower side to urge the wiper blade on the preceding side upward.

According to the above invention, if one of the wiper blades is prevented from being moved due to a load applied thereto, the other of the wiper blades is effectively driven together with the one wiper blade to remove the load.

The above-described objects, and novel feature of the present invention will become apparent more fully from the description of the following specification in conjunction with the accompanying drawings.

BRIEF DESCRIPTION OF THE DRAWINGS

FIG. 7 is an example of a reference table useful for controlling the opposed type wiper apparatus shown in FIG. 5.

FIG. 13 is a set of diagrams in which FIG. 13(a) is an illustration of a state in which the wiper blade of the upper side suffers from snow in the overlapping area and FIG. 13(b) is an illustration of a state in which the wiper blade of the lower side urges the wiper blade of the upper side upward.

DESCRIPTION OF THE PREFERRED EMBODIMENTS

Figure 1:
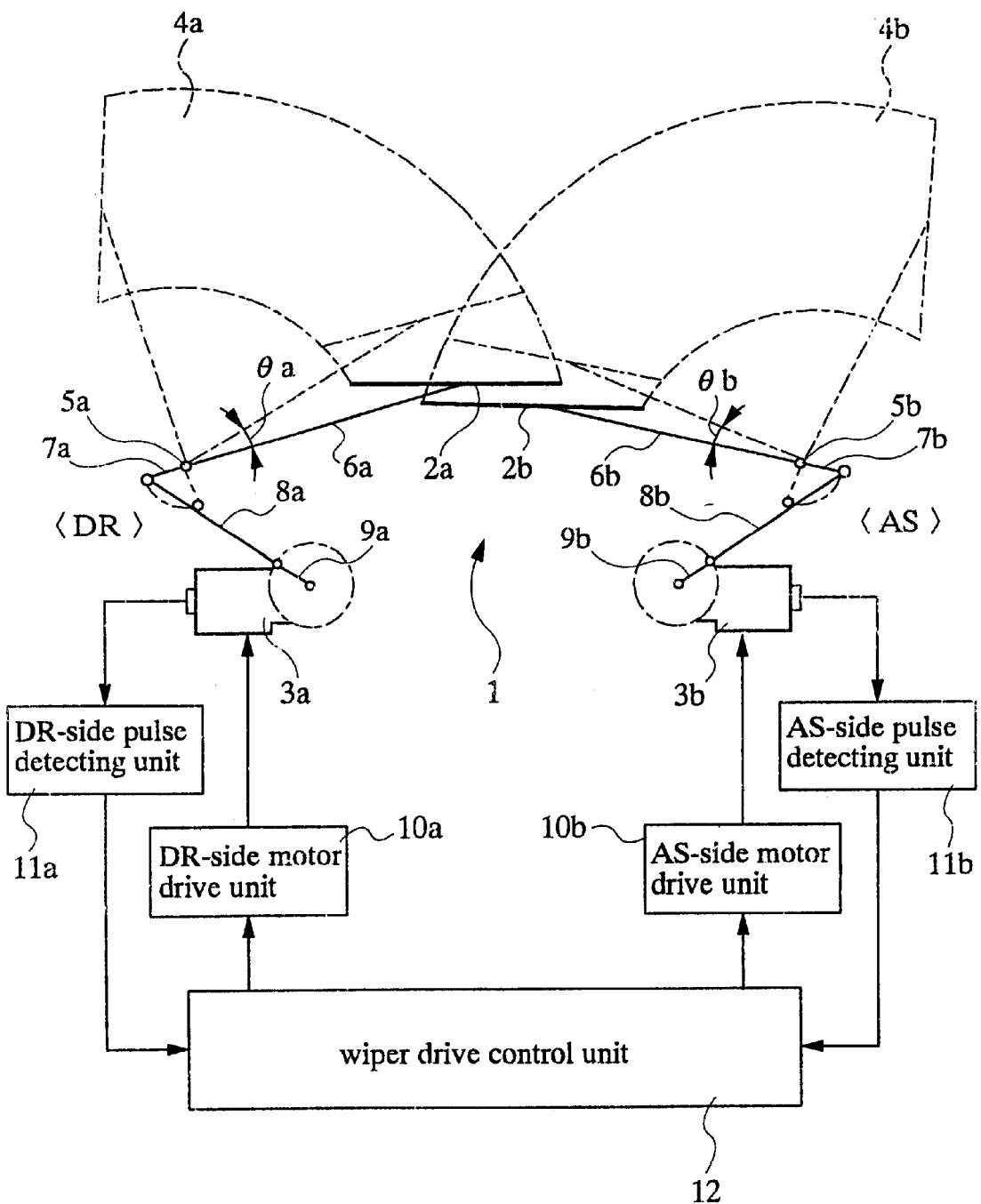
FIG. 1 is a schematic illustration of the structure of an opposed type wiper apparatus to which the present invention can be applied.

Embodiments of the present invention will hereinafter be described in detail with reference to the accompanied drawings. FIG. 1 is a schematic illustration useful for explaining the structure of the opposed wiping type wiper apparatus and the control system thereof.

In FIG. 1, reference numeral 1 depicts a wiper apparatus adaptable to the wiper control method according to the present invention. The wiper apparatus 1 is arranged to wipe a front glass of a vehicle in a so-called opposite fashion in which DR-side wiper blade and AS-side wiper blade are constantly moved in directions opposite to one another. Further, the DR-side wiper blade (as a first wiper blade) 2a and a AS-side wiper blade (as a second wiper blade) 2b (which will be hereinafter referred to as wiper blades 2a and 2b) are driven so that the respective wiping areas overlap each other at their center returning positions.

The wiper blades 2a and 2b are driven with such a preceding-following relationship that the DR-side wiper blade leads the AS-side wiper blade from the lower return positions to the upper return positions while the AS-side wiper blade leads the DR-side wiper blade.

In this wiper apparatus 1, a DR-side motor (as a first motor) 3a and a AS-side motor (as a second motor) 3b (which will be referred to as only motors 3a and 3b) are provided to drive the first wiper blade and the second wiper blade, respectively. Further, they are independently controlled based on the position data (representing angular positions θa and θb) of the wiper blades 2a and 2b. The motor rotation angles, or the angles θa and θb are measured with respect to the lower return position. It should be noted that "a" and "b" attached to reference numerals of corresponding elements represent that the elements with "a" and "b" relate to the DR-side and the AS-side, respectively.

The wiper blades 2a and 2b are attached with blade rubber members (not shown) so that the blade rubber members assure intimate contact of the wiper blades with the front glass of a vehicle, whereby water drops or the like will be wiped out from wiping areas 4a and 4b depicted with one-dot-chain lines in FIG. 1. The wiper blades 2a and 2b are supported on wiper arms 6a and 6b, and the wiper arms 6a and 6b are driven to pivot about wiper shafts 5a and 5b, respectively, so that a fan-shaped wiping areas are formed. The wiper arm 6a, 6b and a drive lever 7a, 7b are connected to each other by way of the wiper shaft 5a, 5b in an opposing fashion. A connection rod 8a, 8b is attached to one end of the drive lever 7a, 7b. The other end of the connection rod 8a, 8b is connected to one end of a crank arm 9a, 9b which is rotated by the motor 3a, 3b. Further, as the motor 3a, 3b rotates, the crank arm 9a, 9b rotates, making the drive lever 7a, 7b swingably move. Thus, rotation of the motor 3a, 3b is converted into swing motion of the wiper arm 6a, 6b.

The motors 3a and 3b are driven by separate drive circuits, e.g., a DR-side motor drive unit 10a and a AS-side motor drive unit 10b, respectively. In addition, the motor 3a, 3b is connected with a DR-side pulse detector 11a, a AS-side pulse detector 11b, which serves as pulse detection means using a Hall element and a rotary encoder, so that the rotation angles of the wiper arm can be detected. In this case, the motor drive unit 10a, 10b is controlled by a wiper drive control unit 12 and detection values from each of the pulse detectors 11a and 11b are supplied to the wiper drive control unit 12.

Figure 2:
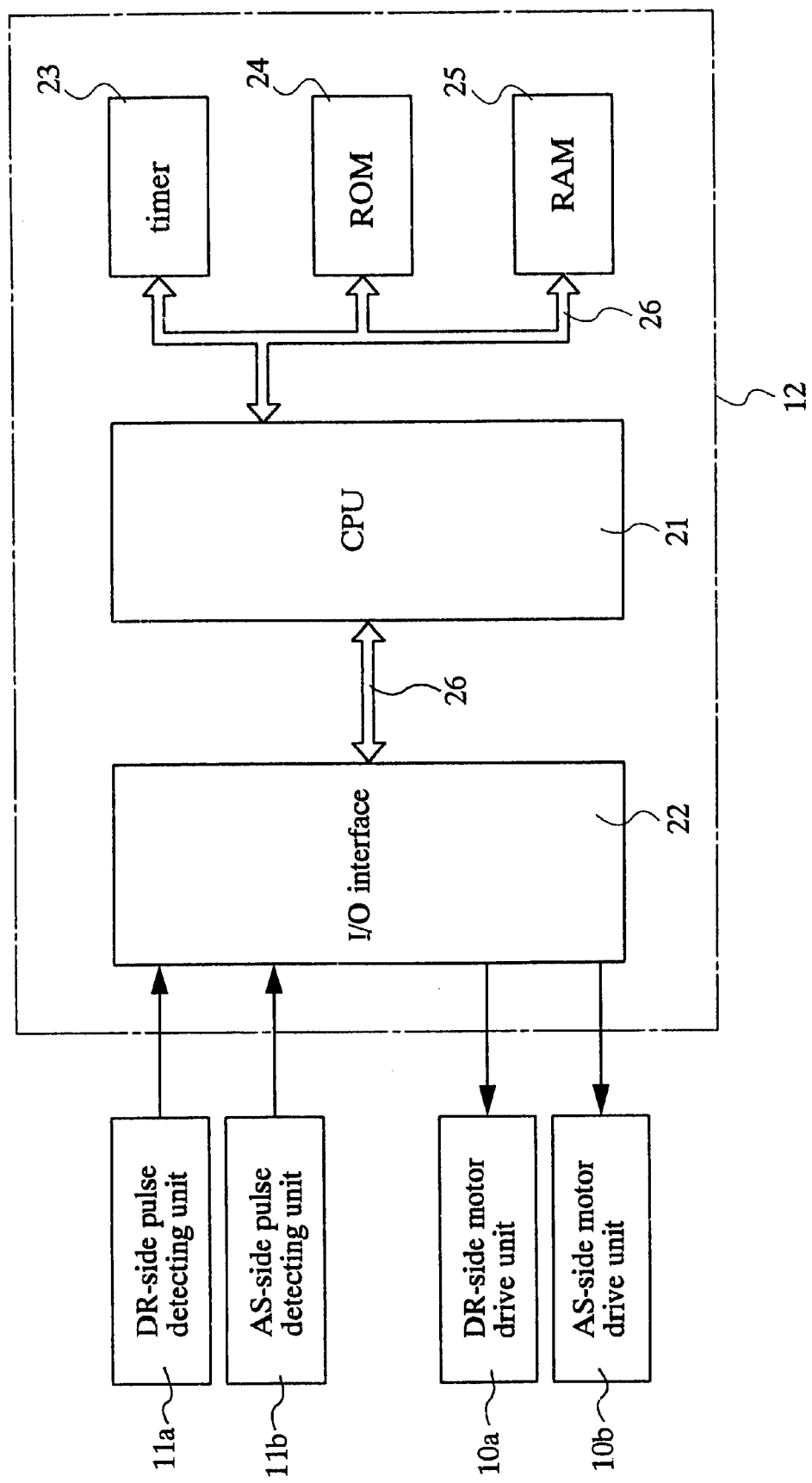
FIG. 2 is a block diagram of an opposed type wiper apparatus to which the present invention can be applied.

FIG. 2 is a block diagram showing the circuit configuration of the wiper drive control unit 12 as an embodiment of the present invention. As shown in FIG. 2, the wiper drive control unit 12 is comprised of a microcomputer and peripheral circuits thereof. In the microcomputer, an I/O interface 22, a timer 23, a ROM 24, and a RAM 25 are connected with each other through a bus line 26 extending radially from a CPU 21. Signals from the pulse detectors 11a and 11b are processed and control signals are supplied to the motor drive unit 10a and 10b, respectively.

The I/O interface 22 is connected with the DR-side pulse detector 11a, AS-side pulse detector 11b, DR-side motor drive unit 10a, and AS-side motor drive unit 10b. Control programs and fixed data for various controls are stored in the ROM 24. RAM 25 stores data of output signals which are subject to data processing useful for supplying to the motor drive units 10a and 10b, and data calculated by the CPU 21. Further, the CPU 21 executes drive control of the wiper apparatus 1 in accordance with the control programs stored in the ROM 24.

Figure 3:
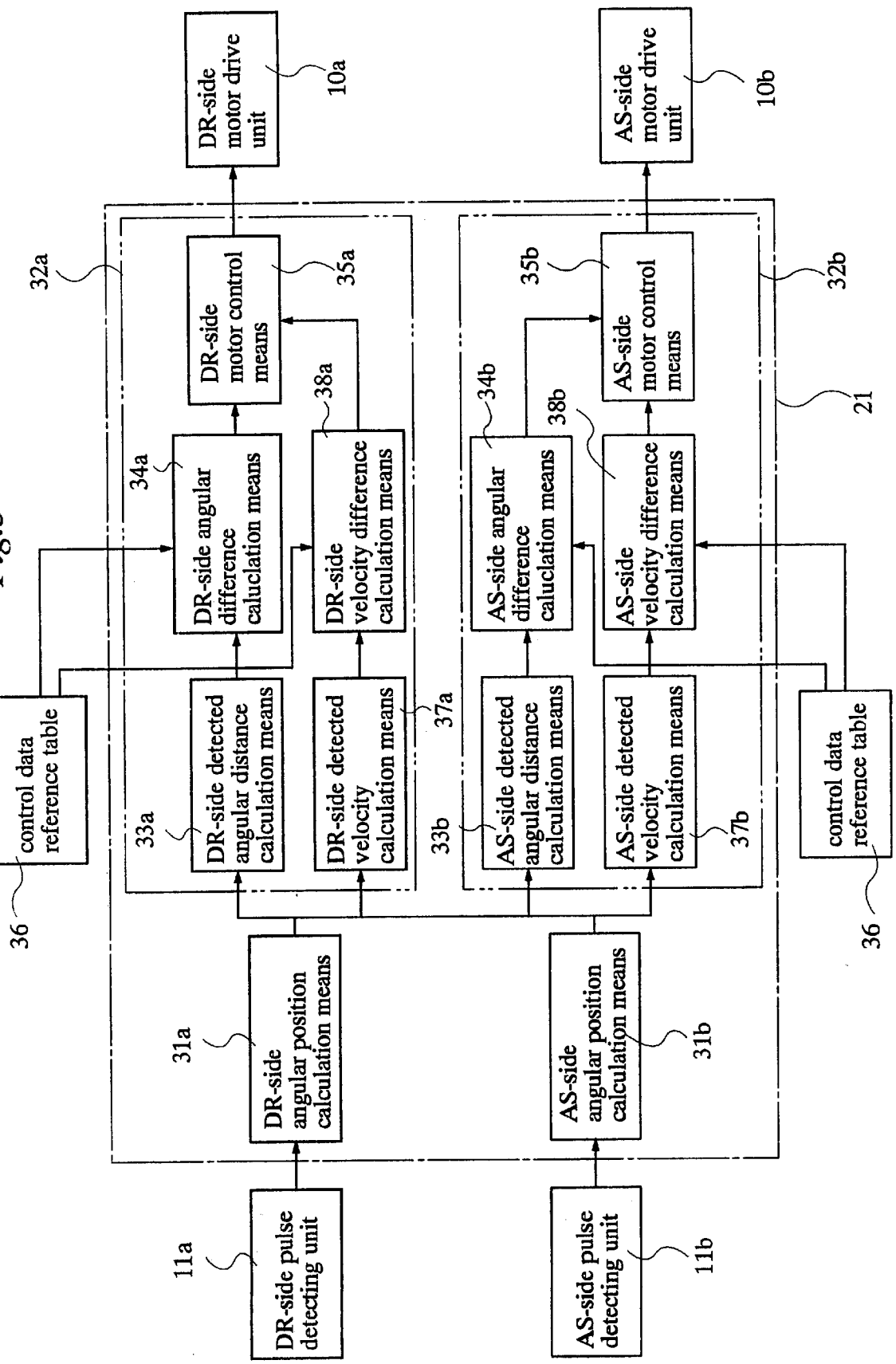
FIG. 3 is a block diagram of a CPU employed by an opposed type wiper apparatus to which the present invention can be applied.

FIG. 3 is a block diagram showing an arrangement of the main function of the CPU 21 as the first embodiment of the present invention. The method for controlling the wiper apparatus according to the present invention will hereinafter be explained below with reference to FIG. 3 which shows the function of the CPU 21, including the processing steps of the method.

As shown in FIG. 3, the CPU 21 includes a DR-side angular position calculation means (as a first wiper blade angular position calculation means) 31a and a AS-side angular position calculation means (as a second wiper blade angular position calculation means) 31b for calculating the current angular positions θa and θb of the wiper blades 2a and 2b, based on pulses supplied from the DR-side pulse detector 11a and the AS-side pulse detector 11b. The CPU 21 also includes a DR-side motor control means 32a and a AS-side motor control means 32b. The DR-side motor control means 32a and the AS-side motor control means 32b calculate control outputs useful for controlling the motors 3a and 3b based on the angular positions of the wiper blades and supply the outputs to the motor drive units 10a and 10b.

In this case, the angular position calculation means 31a and 31b calculate the current angular positions of the wiper blades 2a and 2b by accumulating the pulses supplied from the pulse detectors 11a and 11b. Note that the CPU 21 directly deal with the pulse accumulation counts as the angular positions, and the following processing is carried out based on the pulse counts. However, the following processing may be carried out under condition that the relationship between the pulse counts and the angular positions θa and θb (deg) is previously stored in a form of reference table or the like in the ROM 24. In addition, since one revolution (360°) of the motor corresponds to one cyclic motion of the wiper arm, the rotation angles of the motors 3a and 3b may be obtained from the pulse accumulation counts and may then be dealt with as angular positions x° and the following processing may be then carried out. The following processing may be carried out based on these angular positions.

Also, in the CPU 21, the motor control means 32a and 32b include a DR-side detected angular position calculation means 33a (as a first wiper blade detected angular distance calculation means) and a AS-side detected angular distance calculation means 33b (as a second wiper blade detected angular distance calculation means), respectively. The DR-side detected angular position calculation means 33a (as a first wiper blade detected angular position calculation means) is utilized for calculating an actual angular distance between the wiper blades 2a and 2b observed from the situation of each of the DR-side and AS-side, based on the current angular positions of the wiper blades 2a and 2b, correcting the values upon necessity, and calculating the DR-side detected angular difference. The AS-side detected angular distance calculation means 33b (as a second wiper blade detected angular distance calculation means) also is utilized for calculating the AS-side detected angular distance, in a similar manner.

In this case, the detected angular distance of the DR-side is defined as an angular distance measured from the DR-side relative to the AS-side, while the detected angular distance of the AS-side is defined as a detected angular distance measured from the AS-side relative to the DR-side. For example, if the DR-side wiper blade is position at the angular position of "10" pulses (equivalent to 20° in rotation angle degree of the motor 3a) while the AS-side wiper blade 2b is positioned at the angular position of "3" pulses, the DR-side detected angular distance (or the first wiper blade detected angular distance) is "+7" by subtracting the angular position in the AS-side from the angular position in the DR-side (10–3). On the other hand, as viewed from the AS-side, the AS-side detected angular distance (or the second wiper blade detected angular distance) in this situation is "–7" by subtracting the AS-side detected angular distance (or the second wiper blade detected angular distance) from the angular position of the AS-side wiper blade 2b as a reference.

Next, in the downstream of the detected angular distance calculation means 33a and 33a, respectively, there are provided a DR-side angular difference calculation means 34a (as a first wiper blade angular difference calculation means) and a AS-side angular difference calculation means (as a second wiper blade angular difference calculation means). Each of them calculates angular difference representing the difference between the detected angular distance and the target angular distance at the present time point by comparing the target angular distance as a target value of the angular position distance between both the wiper blades 2a and 2b, with the detected angular distance obtained previously.

Figure 4:
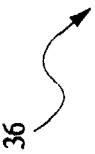
FIG. 4 is an example of a reference table useful for controlling the opposed type wiper apparatus shown in FIG. 3.
Figure 5:
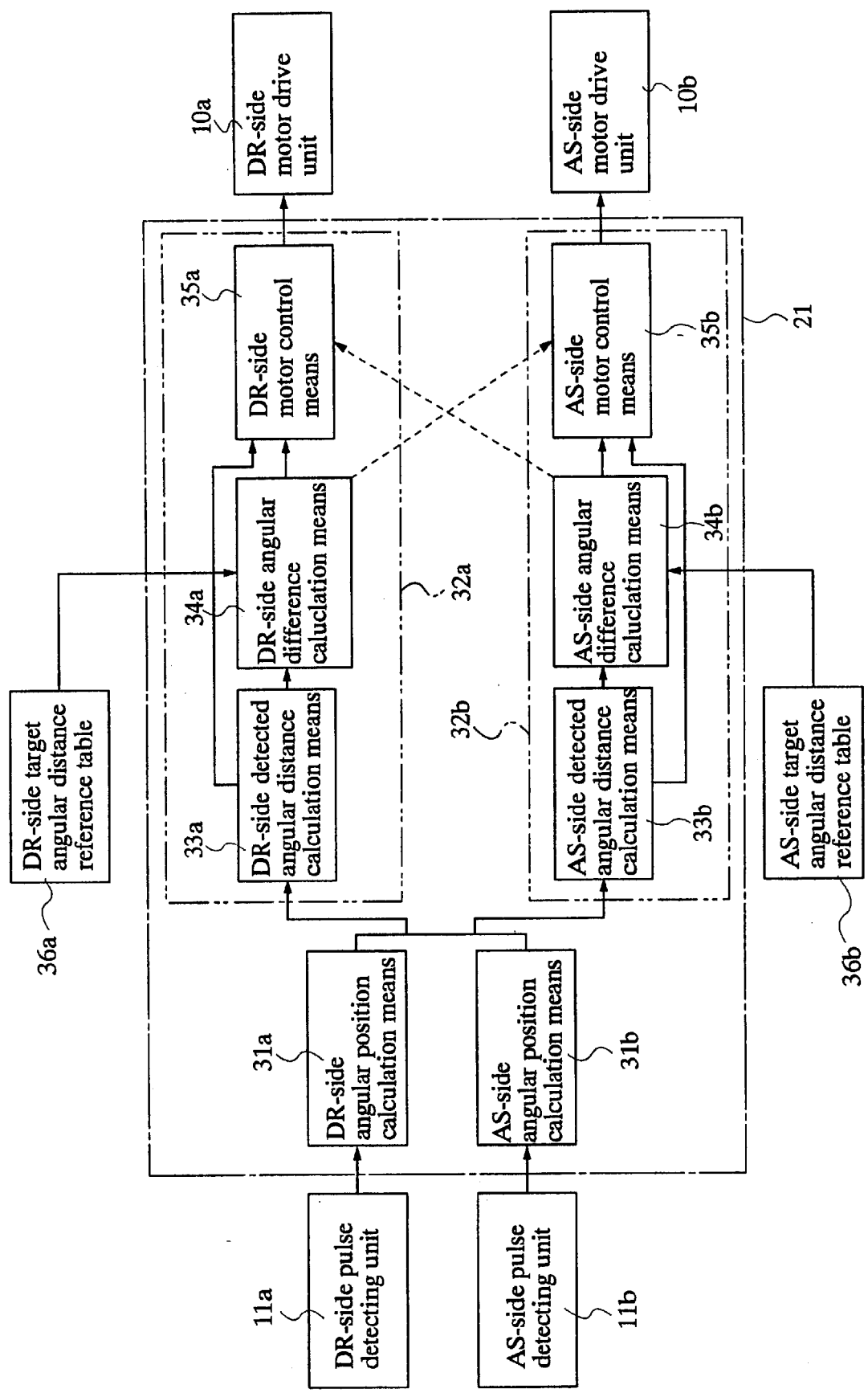
FIG. 5 is a block diagram of a CPU employed in an opposed type wiper apparatus as a first embodiment of the present invention.

The target angular distance utilized for comparison with the detected angular distance is read from each of a DR-side target distance reference table 36a and a AS-side target angular distance reference table 36b which are prepared in the ROM 24. FIGS. 4 and 5 show the structure of these reference tables. FIG. 4 shows the DR-side target angular distance reference table 36a containing target angular distances (or first wiper blade target angular distances) in relation to the angular position in the DR-side as a reference. FIG. 5 shows the DR-side target angular distance reference table 36a containing target angular distances (or second wiper blade target angular distances) in relation to the angular position in the AS-side as a reference.

In this case, for example, it will be found from the DR-side target angular distance reference table 36a in FIG. 4 that when the angular position in the DR-side is "10" pulses and corresponding target angular distance of the AS-side is "5" pulses, which requests that the target angular distance between both sides is "+5". If data of "DR=10, AS=7" is obtained and actual detected angular distance is found to be "+3", as in the above example, the DR-side angular difference calculation means 34a carries out arithmetic operation of ((+5)−(+3)) to determine that the DR-side angular difference (or first wiper blade angular difference) of "+2". This data represents a state that the wiper blade of the AS-side precedes by "2" pulses amount relative to the target angular distance, as viewed from the DR-side wiper blade (i.e., the blade in the AS-side is excessively coming close to the DR-side).

By contrast, as will be understood from the AS-side target angular distance reference table 36b shown in FIG. 5, when the angular position in the AS-side is "7" pulses in the case of the above example (where DR=10, AS=7), the angular position target in the DR-side is "14" pulses and the target angular distance between both sides is "−7". In this respect, since the detected angular distance is "−3" (7−10) in the above example, the AS-side angular difference calculation means 34b calculates AS-side angular difference (second wiper blade angular difference) of "−4" ((−7)−(−3)) with respect to the target angular distance. This data represents that the wiper blade in the DR-side is delayed by "4" pulses relative to the target angular distance, viewed from the following wiper blade in the AS-side (i.e., the blade in the DR-side is coming close to the other).

Meanwhile, in each of the target angular distance reference tables 36a and 27a, the data distribution of pulses concerning the follower side is rougher than the preceding side. This is because control for the follower side blade must be much finer than for the preceding wiper blade in order to control the wiper blades such that the following wiper blade might not collide with the leading one. In this time, pulse division for the preceding side may be coarse. To see the pulse division in the reference tables, for example, the target angular distance in the AS-side is 1 pulse while the target angular distance in the DR-side ranges from 1 to 3 pulses in FIG. 4. The target angular distance in the AS-side is set to shift like steps. In other words, the wiper blade in the DR-side moves by 3 pulses while the following AS-side moves one pulse, and the data for the DR-side is arranged to be coarse accordingly. In FIG. 5, the target value is set such that the blade in the DR-side moves forward by two pulses while the blade in the AS-side moves by 2 pulses at the initial motion. This means that the DR-side wiper blade moves by two pulses in response to the motion of the following AS-side wiper blade by 1 pulse, and thus, the data for the preceding DR-side is coarse as described above.

Therefore, there can be taken place a case where the control data arrangements for the wiper blades are different from each other in spite of the fact that the angular positions taken by the DR-side and the AS-side are identical to each other. For example, when angular position data of "DR=3, AS=1" is obtained, the DR-side detected angular distance "2" (3−1) is equal to the target angular distance "2" according to FIG. 4, and therefore, the data is taken as OK. However, referring to FIG. 5, the target angular distance is "−1" with respect to "AS=1", and the detected angular distance of "−2" (1−3) is therefore NG in this case. Consequently, normal control is carried out in the DR-side while the following control is carried out in the DR-side to recover a delay.

In the wiper apparatus 1, the preceding side and the follower side are exchanged at an upper return position as the boundary. That is, in the returning way, the AS-side leads the DR-side. Accordingly, in the target angular distance reference tables 36a and 36b, the wiper blade in the AS-side leads after pulses 124 beyond pulses 90 although not shown in the figures. Note that the reference tables shown in FIGS. 4 and 5 are merely examples and the formats and values of the reference tables are naturally not limited thereto.

Thus, in the wiper control apparatus to which the present invention can be applied, the DR-side and the AS-side are respectively provided with reference tables which include a set of data corresponding to each other, and each of the wiper blades 2a and 2b having different moving velocities is controlled so as to take into account the angular positions of its own and that of the other. Therefore, even if fluctuation is caused on the angular distance between the wiper blades 2a, 2b due to the external load or the like, both of the motors 3a and 3b can cope with the fluctuation by changing the output therefrom. Therefore, both of the wiper blades will be brought to have the target angular distances swiftly and fluctuation in the angular distance between the wiper blades will be suppressed.

The CPU 21 carries out wiper control based on data concerning the velocities of the wiper blades 2a and 2b as well as data concerning the angular positions thereof. That is, the CPU 21 includes in its the motor control means 32a and 32b, a DR-side wiper blade detected velocity calculation means 37a (or first wiper blade detected velocity calculation means) and a AS-side wiper blade detected velocity calculation means 37b (or second wiper blade detected velocity calculation means), and a DR-side velocity difference calculation means 38a (or first wiper blade detected velocity difference calculation means) and a AS-side velocity difference calculation means 38b (or first wiper blade detected velocity difference calculation means), respectively.

The DR-side and AS-side wiper blade detected velocity calculation means 37a and 37b function to calculate the actual velocities of the wiper blades 2a and 2b at present and obtain the velocities of the wiper blades 2a and 2b by taking the velocities as the times respectively required for the blades to move 1 pulse, i.e., the necessary time per pulse.

The DR-side and AS-side wiper blade detected velocity calculation means 37a and 27b are supplied with the angular positions of the wiper blades 2a and 2b from the angular position calculation means 31a and 31b. Then, the DR-side and AS-side wiper blade detected velocity calculation means 37a and 27b calculate the necessary times per pulse required for the wiper blades 2a and 2b based on the obtained angular positions and the clock count of the timer 23. Thereafter, the DR-side and AS-side wiper blade detected velocity calculation means 37a and 27b supplies these times as the detected velocities of the wiper blades 2a and 2b to the DR-side and AS-side velocity difference calculation means 38a and 38b in the next stage.

Subsequently, the DR-side and AS-side velocity difference calculation means 38a and 38b compare the detected velocities of the wiper blades with the target velocities of the wiper blades which are stored in advance in the control reference table 36c described above. Referring to the control reference table 36c in FIG. 4, for example, if the wiper blade in the DR-side is at "10" pulses, it is found that corresponding DR-side target velocity (or target cycle) is "3268" from the table. The set of target velocities is prepared for each of the DR-side and AS-side, and each of the target velocities is made corespondent to every possible angular position which is determined at every pulse count and thus taken by each of the DR-side and AS-side wiper blades. For example, if the DR-side wiper blade takes an angular position corresponding to "1" pulse amount, the corresponding target velocity for the DR-side wiper blade is "3617" pulse count per unit cycle. When the DR-side wiper blade travels by one pulse amount, or the wiper blade reaches the angular position of "2" pulse amount, the corresponding target velocity for the DR-side wiper blade becomes "2893", which results from addition of "3617" with "–723" in the column of added cycle. This means that the DR-side wiper blade is decelerated when it reaches the angular position of the "2" pulses amount as compared with the angular position of the 1 pulse amount. In this way, the wiper blade is accelerated or decelerated depending on the entries of the column of added cycle at every angular position.

With use of this kind of control reference table 36c, the target velocities of the wiper blades 2a and 2b can be finely determined in correspondence with their own angular positions, respectively, so that the target velocity can be changed smoothly for every angle. Accordingly, it is possible to smoothen the output values of the motors which otherwise are generated by merely changing the target angular distances upon necessity in a discrete fashion. In addition, it is possible to realize fine velocity control in which velocities are changed while the angle distance between the DR-side wiper blade and the AS-side wiper blade is maintained constant. Further, if the external force applied on both of the wiper blades are equal and hence change is caused only on velocity but no change on distance between the wiper blades, this change on velocity is detected and feedback control can be effected on the velocity change. Therefore, the period for one cyclic motion for the wiper blades can be maintained constant.

The DR-side angular difference calculation means 38a compares the detected velocity with the corresponding DR-side target velocitiestored in the control data reference table 36c as described above, thereby to obtain the DR-side velocity difference which is indicative of difference between the detected velocity and target velocity. That is, for example, if a value "4000" is obtained as a detected velocity of the wiper blade 2a, the DR-side velocity difference calculation means 38a prepares DR-side velocity difference of "+732" (4000–3268). On the other hand, the AS-side velocity difference calculation means 38b compares the detected velocity of the wiper blade 2b with the AS-side target velocity previously stored in the control data reference table 36c and produces AS-side velocity difference, in a similar manner.

In the rear stage of the angular difference calculation means 34a and 34b and the velocity difference calculation means 38a and 38b, there are provided a DR-side motor control means 35a (as a first motor control means) and a AS-side motor control means 35b (as a second motor control means) for calculating and determining the outputs for the motors 3a and 3b based on the obtained angular difference and the velocity difference data. As described above, the DR-side control means 35a and the AS-side motor control means 35b generate outputs for the motors 3a and 3b so that the difference between the detected angular distance and target angular distance and also the difference between the detected velocities and the target velocities, and supply the outputs to the motor drive units 10a and 10b, respectively. That is, also in the wiper control apparatus according to the present invention, observations are carried out not only on the difference between the detected angular distance and the target angular distance but on difference between detected velocities and the corresponding target velocities, and control is effected on the wiper blades 2a and 2b so that these differences are made small.

Thus, for example, the DR-side motor control means 35a is initially supplied with a value of "+2" as the information of the DR-side angular difference on the above example. Then, the DR-side motor control means 35a takes into account information of the velocity difference and calculates an output for the DR-side motor 3a for later use. For this reason, the output newly generated for the motor 3a is determined as follows:

"new output=$a$×(target angular distance−detected angular distance)+$b$×(target velocity−detected velocity)

where a and b are coefficients".

With regard to the angular difference of the above-described example, it is recognized that the AS-side wiper blade is excessively brought close to the DR-side wiper blade as compared with the target angular distance by two pulse amount. In accordance with the recognition, the DR-side wiper blade is controlled to widen the angular distance relative to the AS-side wiper blade. Thus, a new output (rotation rate) higher than the current output is generated for the DR-side wiper blade, thereby to bring the angular distance close to the target angular distance. As for the velocity difference, since "+732" is obtained, it is recognized that the velocity of the DR-side wiper blade is higher than the target velocity, and therefore, the output (or rotation velocity) is calculated in consideration of the angular difference described above. Further, a control signal is supplied to the DR-side motor drive unit 10a so as to realize the output.

Similarly to the manner of the above example, the AS-side motor control means 35b is supplied with a value of "−4" as information of the AS-side angular difference. Then, the AS-side motor control means 35b calculates an output for the AS-side motor 3b based n information of the velocity difference, in addition to the information. With regard to the angular difference of this case, it is recognized that the DR-side wiper blade is excessively brought close to the AS-side wiper blade as compared with the target angular difference by "4" pulse amount. In accordance with the recognition, new output (rotation rate) is generated for the AS-side which is lower than the current output. Then, a control signal is supplied to the AS-side motor drive unit 10b so as to realize the output.

In this way, according to the wiper apparatus 12, when the angular distance between the wiper blades 2a, 2b becomes smaller than the target angular distance, or they are brought close to each other, the output for the preceding side is increased while the output for the following side is decreased, whereby the angular distance between the wiper blades is made close to the target angular distance. On the other hand, when the angular distance between the wiper blades 2a, 2b becomes larger than the target angular distance, or they are brought apart from each other, the output for the preceding side is decreased while the output for the following side is increased, whereby the angular distance between the wiper blades is made close to the target angular distance. In addition, if the velocities of the wiper blades 2a, 2b are larger than the target velocities, respectively, then the outputs of the corresponding motors 3a, 3b is decreased while if the velocities of the wiper blades 2a, 2b are smaller than the target velocities, respectively, then the outputs of the corresponding motors 3a, 3b is increased.

Thus, the wiper blades are subject to control based on the target angular distance and target velocities, with the result that the motion of the wiper blades becomes smooth and fluctuation in the wiping cycle is eliminated.

While in the above example the control data of the target angular distances and control data of the target velocities are stored together in a single reference table, a reference table may be prepared for each of the control data of the target angular distances and control data of the target velocities and stored in the ROM 24.

Thus, according to the wiper apparatus to which the present invention can be applied, in addition to the control based on the angular distance between the wiper blade, the target velocities for the wiper blades are set for every possible angular position and the motions of the wiper blades are controlled by comparing the detected velocities with the target velocities. Therefore, it is possible to realize a wiper motion control in a much finer way. Accordingly, if the set of target velocities is arranged for every possible angular position to realize smoother wiper motions, the wiper motion will become smoother as compared with a control based on only the angular distances.

Next, explanation will be made to a system as a first embodiment of the present invention in which the wiper blade which has been overtaken by the other wiper blade is prevented from catching up with the other wiper blade which has overtaken so that the wiper blades might not be locked in case where the predetermined preceding-following relationship is changed with respect to the left and right wiper blades.

FIG. 5 is a block diagram of the wiper apparatus to which the present invention is applied. The fundamental configuration of the wiper apparatus shown in FIG. 5 is same as that of the apparatus shown in FIGS. 1 and 2. Also, parts corresponding to those of FIG. 3 are attached with the same reference numerals and they will not be described.

As shown in FIG. 5, the CPU 121 has a DR-side position angle calculation means 31a and a AS-side position angle calculation means 31b as well as a DR-side motor control means 32a and a AS-side motor control means 32b, like the CPU 21 described above. Also, in the present CPU 121, the motor control means 32a and 32b comprise respectively a DR-side detected angular distance calculation means 33a and a AS-side detected angular distance calculation means 33b. Further, in the rear stages of the detected angular distance calculation means 33a and 33b, there are provided respectively a DR-side angle difference data calculation means 34a and a AS-side angle difference data calculation means 34b.

Figure 6:
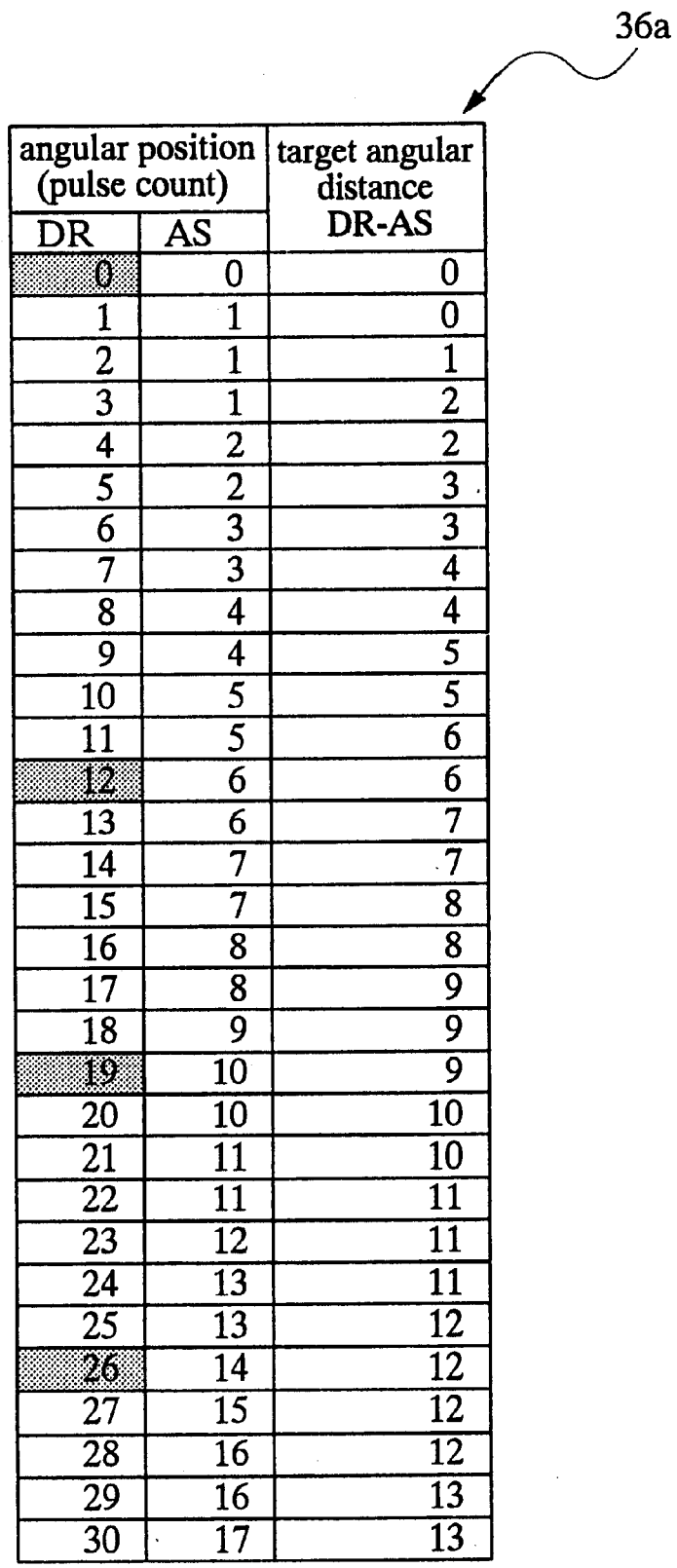
FIG. 6 is an example of a reference table useful for controlling the opposed type wiper apparatus shown in FIG. 5.

Target angular distances as comparative objects are read from a DR-side target angular distance reference table 36a and a AS-side target angular distance reference table 36b previously stored in the ROM 24. FIGS. 6 and 7 show the structures of these maps. FIG. 6 shows the DR-side target angular distance reference table 36a indicating the target angular distance (or first wiper blade target angular distance) with respect to the position angle in the DR-side as a reference, and FIG. 5 shows the AS-side target angular distance reference table 36b indicating the target angular distance (or second wiper blade target angular distance) with respect to the position angle in the AS-side as a reference. Note that the maps 36a and 36b in FIGS. 6 and 7 each have the same structure as the map 36 in FIG. 4. For example, when the position angle in the DR-side is "10" pulses, the position angle target in the AS-side is "5" pulses, and therefore, the target angular distance between both sides is "+5". In addition, the data distribution of pulses is coarser in the preceding side than in the follower side also in the maps 36a and 36b.

In the rear stages of the angle difference data calculation means 34*a* and 34*b*, there are further provided a DR-side motor output calculation means 35*a* and a AS-side motor output calculation means 35*b*. Here, the motor output calculation means 35*a* and 35*b* determine the preceding-following relationship between the wiper blades from the detected angular distance. The means 35*a* and 35*b* thereafter calculate such outputs of the motors 3*a* and 3*b* based on the angle difference data that reduce the difference between the target angular distance and the detected angular distance is reduced, and instruct the outputs to the motor drive devices 10*a* and 10*b*. Note that a DR-side wiper blade measurement speed calculation means 37*a* and a AS-side wiper blade measurement speed calculation means 37*b* as well as a DR-side speed difference data calculation means 38*a* and a AS-side speed difference data calculation means 38*b* may be provided as shown in FIG. 3 and wiper control may be carried out while grasping data concerning the speeds of the wiper blades 2*a* and 2*b*.

Suppose the example described above (where "DR=1, AS=7"), the DR-side motor output calculation means 35*a* obtains a detected angular distance "+3" and DR-side angle difference data "+2" and calculates the output of the DR-side motor 3*a*, based on the difference and the data. In this case, it is recognized from the obtained detected angular distance that the preceding-following relationship between the DR-side and the AS-side is correctly maintained, and it is then recognized from the DR-side angle difference data that the AS-side is closer than the target value. That is, in the approach route, since the preceding-following relationship is such that the DR-side leads the AS-side, the detected angular distance is normally "+". In this case, since the value of the detected angular distance is "+3", the preceding-following relationship between both sides is found to be normal. In addition, from the DR-side angle difference data, it is recognized that the AS-side is closer by "two" pulses than the target value. Therefore, in accordance with this recognition, the DR-side motor output calculation means 35*a* calculates a higher output (or rotation speed) for the DR-side than at present so that the positional angular distance is enhanced and approximates to the target value. Further, a control signal is supplied to the DR-side motor drive device 10*a* to realize this output.

Also, in the case of the above example, the AS-side motor output calculation means 35*b* obtains a detected angular distance "−3" and AS-side angle difference data "−4", and calculates the later output of the AS-side motor 3*b*, based on the difference and the data. In this case, it is recognized from the obtained detected angular distance that the preceding-following relationship between the AS-side and the DR-side is correctly maintained, and it is then recognized from the AS-side angle difference data that the DR-side is close. That is, in the approach route, the preceding-following relationship is such that the AS-side follows the DR-side, and the detected angular distance is therefore normally "−". In this case, since this value is "−4", it is found that the preceding-following relationship between both sides is normal. In addition, it is recognized from the AS-side angle difference data that the DR-side is closer by "4" pulses than the target value. Therefore, in according with this recognition, the AS-side motor output calculation means 35*b* calculates a lower output (or rotation speed) for the AS-side than at present so that the positional angular distance is enhanced and approximates to the target value. Further, a control signal is supplied to the AS-side motor drive device 10*b* to realize this output.

Further, in the present wiper control apparatus 112, the motors 3*a* and 3*b* are controlled independently from each other such that the detected angular distance between the wiper blades 2*a* and 2*b* approximates to the target angular distance.

Meanwhile, consideration will now be taken into a case that the orders of the DR-side and the AS-side are replaced with each other so that their positions are, for example, changed to "DR=7, AS=10" in their approach routes while control described above is being carried out. If the AS-side thus overtakes and leads the DR-side, the output of the AS-side which has overtaken is decreased and the output of the DR-side which has been overtaken is increased to reduce the positional angular distance in case of the control based on the positional angular distance as described above.

To discuss this respect with reference to the example described above (DR=7, AS=10), the DR-side detected angular distance is "−3" and the target angular distance is "−4" from the target angular distance reference table 36*a* in FIG. 4. Therefore, the angle difference data is "(+4)−(−3)=+7". Accordingly, the DR-side motor output calculation means 35*a* determines that the AS-side has moved ahead to be closer by "7" pulses than the target position angle, viewed from the DR-side, and the output of the DR-side overtaken by the AS-side is increased such that the positional angular distance approximates to the target angular distance.

Also, the AS-side measurement difference is "+3", and the target angular distance is "−10" from the target angular distance reference table 36*a* from FIG. 5. Therefore, the angle difference data is "(−10)−(+3)=−13". Accordingly, the AS-side motor output calculation means 35*b* determines that the DR-side is delayed by "13" pulses from the target position angle, viewed from the AS-side, and the output of the AS-side which has overtaken the DR-side is decreased.

If this control is continued, the following DR-side catches up with the leading AS-side so that the wiper blades are brought into contact with each other and locked thereby. Therefore, in the wiper drive control apparatus 112, the control forms for the AS-side and the DR-side are replaced with each other after the orders of the wiper blades are replaced with each other, such that the speed of the side which has overtaken is higher than the other side which has been overtaken, so that the side which has been overtaken might not catch up with the other side which has overtaken thereby locking them together.

Here, the motor output calculation means 35*a* and 35*b* determine whether or not the preceding-following relationship between the wiper blades 2*a* and 2*b* has not been changed depending on the detected angular distance, when calculating the motor outputs based on the angle difference data. At this time, the DR-side determines that the relationship has been changed if a detected angular distance indicating that the DR-side is delayed from the AS-side is obtained, i.e., if a "−" detected angular distance is obtained. For example, in the example described above, the detected angular distance "−3" is calculated where "DR=7, AS=10" exists. If this value is obtained by the DR-side motor output calculation means 35*a*, it is determined that the AS-side has overtaken the DR-side and the relationship is changed.

Likewise, in the AS-side, it is determined that the preceding-following relationship has been changed if the detected angular distance has become "+" in the approach routes. For example, in the above-mentioned example ("AS=10, DR=7"), the detected angular distance is "+3" and the AS-side motor output calculation means 35*b* also determines that the AS-side has overtaken the DR-side and their relationship has been changed. In the return routes, the preceding-following relationship of both sides is inverted and a reverse determination is made (e.g., the relationship is changed if the detected angular distances are "+" in the DR-side and "−" in the AS-side).

Upon determination of a change of the preceding-following relationship, the motor output calculation means 35a and 35b thereafter calculate the motor outputs so as to drive the motors 3a and 3b in accordance with the control forms for opposite motors, respectively, until the wiper blades 2a and 2b reach the upper return positions. That is, after recognition of the change of the preceding-following relationship, the DR-side motor 3a is controlled by data for the AS-side and the AS-side motor 3b is controlled by data for the DR-side.

Accordingly, for example, the DR-side motor output calculation means 35a obtains angle difference data from the AS-side angle difference data calculation means 34a and determines the output of the DR-side motor 3a, based on the data. To discuss this in the example described above, the DR-side motor output calculation means 35a obtains "−13" as angle difference data and uses this data as DR-side angle difference data. This means that the AS-side is delayed (or more apart) by "13" pulses from the DR-side, as the DR-side angle difference data, viewed from the DR-side. The DR-side motor output calculation means 35a delays the DR-side (which has been overtaken) such that the positional angular distance approximates to the target value.

In contrast, the AS-side motor output calculation means 35b obtains angle difference data from the DR-side angle difference data calculation means 34a and determines the output of the AS-side motor 3b, based on the obtained data. Therefore, according to the example described above, the AS-side motor output calculation means 35b obtains "+7" as angle difference data and uses this data as the AS-side angle difference data. This means that the DR-side runs faster (or more apart) by "7" pulses than the target angular distance, viewed from the AS-side. The AS-side motor output calculation means 35b makes the AS-side (which has overtaken the other side) move faster so as to approximate the positional angular distance to the target value.

Therefore, by thus controlling the DR-side and the AS-side, the positional angular distance between both sides is enhanced immediately after the change of the preceding-following relationship. It is therefore possible to avoid a situation that the wiper blades are brought into contact with each other. Thereafter, both wiper blades are driven with their control forms replaced with each other, and the control forms are returned to original forms when the wiper blades reach the upper return positions. That is, if change of the preceding-following relationship occurs in the approach routes, the control forms for the DR-side and the AS-side are replaced with each other until the upper return positions after the occurrence of the change of the preceding-following relationship. If change of the preceding-following relationship occurs in the return routes, control forms for the DR-side and the AS-side are replaced with each other until the upper returning positions through the lower returning positions after the change of the relationship. This is because control is executed so as to make the DR-side lead and the wiper blades are locked at the lower returning positions if the control forms are returned to original forms.

If change of the preceding-following relationship occurs again due to some factor and the regular preceding-following relationship is recovered after change of the preceding-following relationship once occurred and the control forms were replaced with each other, the control forms are returned to original forms and the wiper blades are controlled by a normal control form.

In the embodiment described above, after occurrence of change of preceding-following relationship, the position angle data of the DR-side and that of the AS-side are replaced with each other to prevent the wiper blades from contacting each other. However, the control is not limited to this embodiment, as long as the speed of the side which has overtaken is higher than that of the side which has been overtaken after occurrence of change of the preceding-following relationship. For example, control may be carried out by inverting the code of the obtained angle difference data after detection of change of the preceding-following relationship. To explain this with reference to the example described above, the control of the motors 3a and 3b are carried out in such a manner in which the DR-side motor output calculation means 35a converts the angle difference data of "+7" into "−7" and the AS-side motor output calculation means 35b converts the angle difference data of "−13" into "+13". In this manner, the output of the DR-side which has been overtaken is decreased and the output of the AS-side which has overtaken is increased. In this manner, the output of the DR-side which has been overtaken is decreased and the output of the AS-side which has overtaken is increased, so that the speed of the side which has overtaken is higher than the speed of the side which has been overtaken. Accordingly, it is possible to avoid a situation that the wiper blades of both sides contact each other.

Thus, in the control form according to the first embodiment, if a predetermined preceding-following relationship between the left and right wiper blades is changed, the speed of the wiper blade which has overtaken is arranged to be higher than the speed of the wiper blade which has been overtaken by replacing the control forms of both sides with each other until the wiper blades reach upper return positions. Therefore, it is possible to avoid a situation that the side which has been overtaken catches up with the other side which has overtaken so that both wiper blades are brought into contact with each other and are thereby locked. Accordingly, it is possible to prevent a situation that the preceding-following relationship between the left and right wiper blades is changed and the wiper apparatus is thereby stopped.

Further, explanation will be made of a system as a second embodiment of the present invention in which a locking state and a factor thereof are consciously detected and processing for elimination thereof is carried out even if left and right wiper blades are locked due to change of the preceding-following relationship or due to an obstacle.

Figure 8:
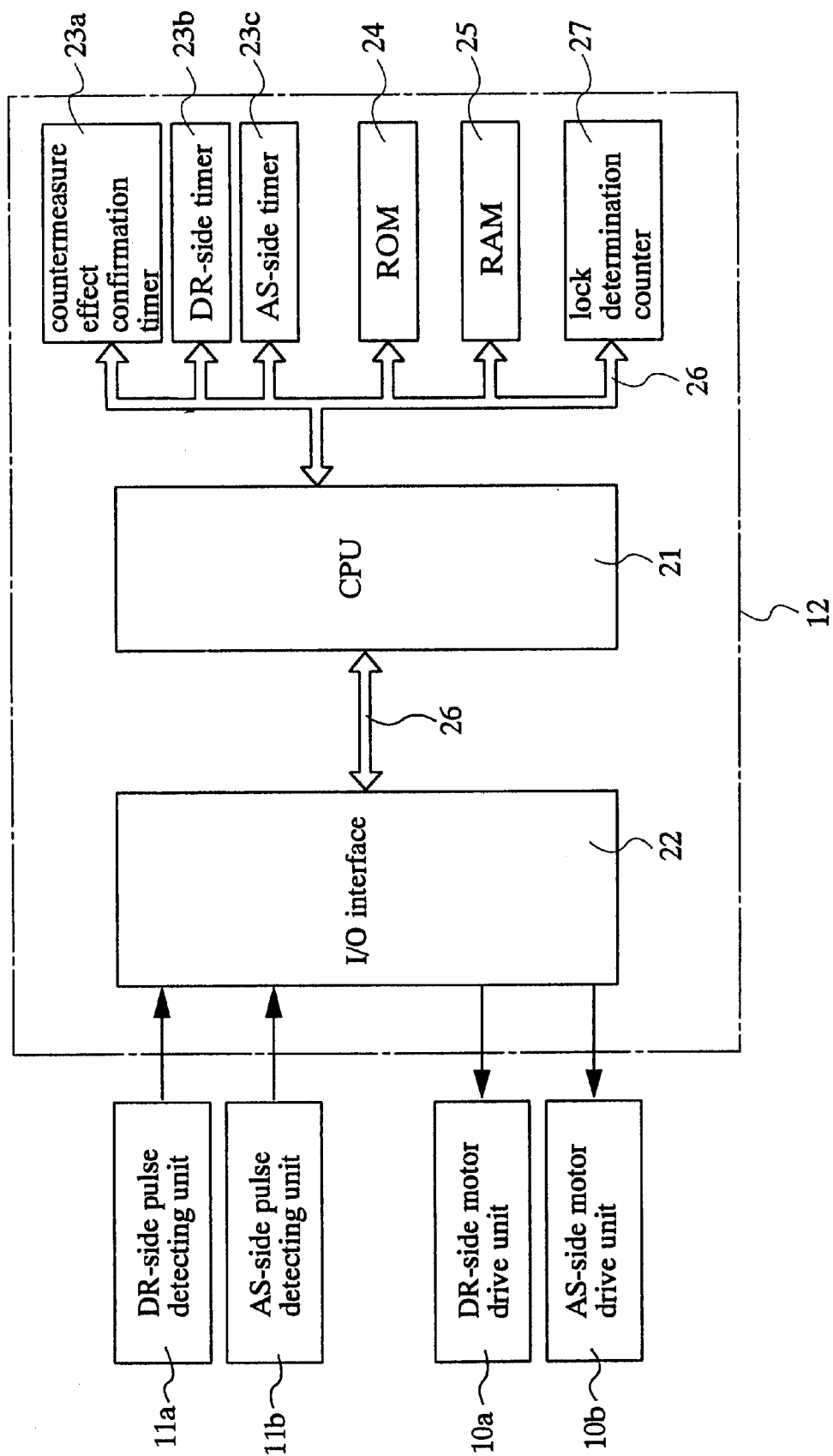
FIG. 8 is a block diagram of an opposed type wiper apparatus as a second embodiment of the present invention.
Figure 9:
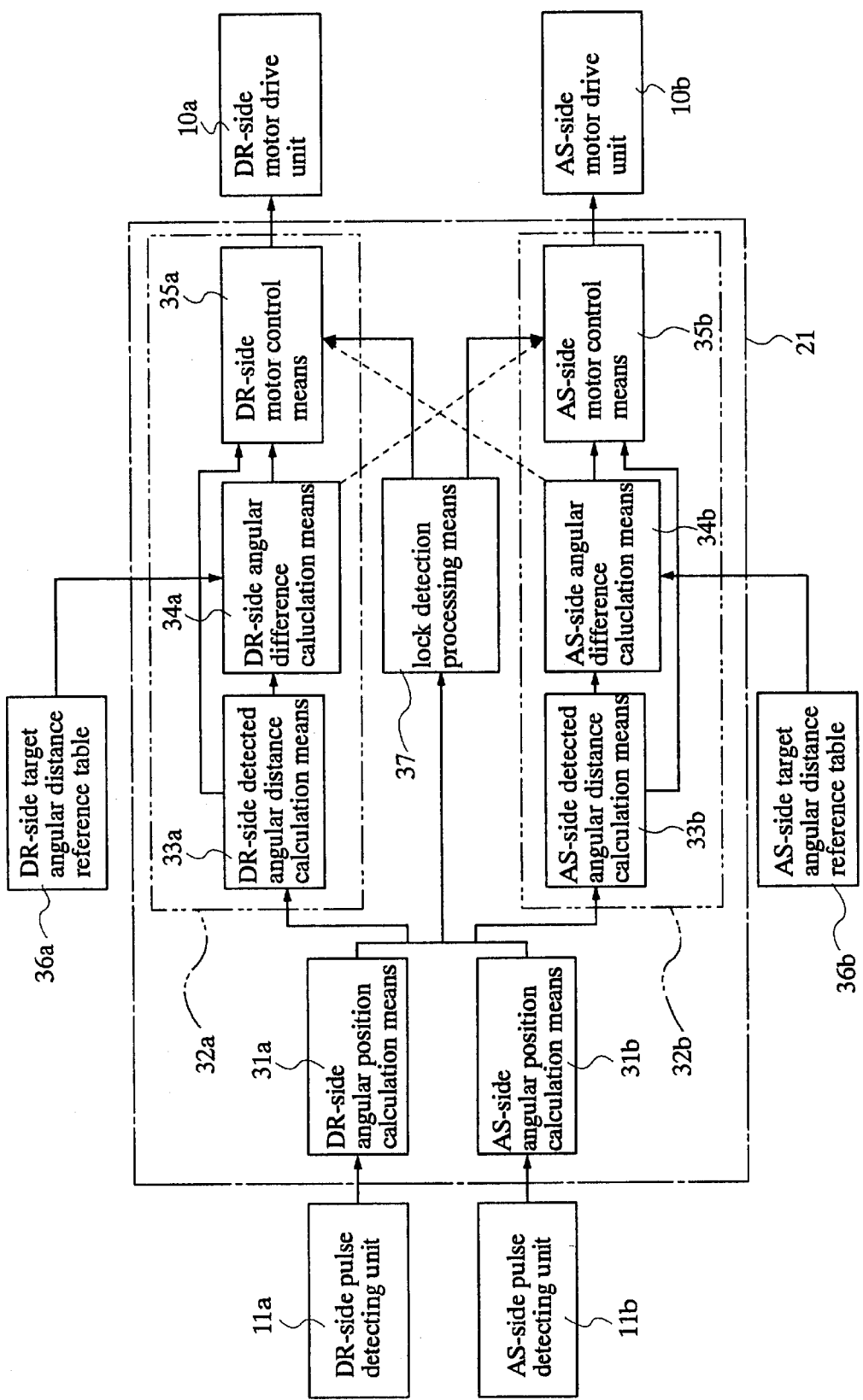
FIG. 9 is a block diagram of the opposed type wiper apparatus as a second embodiment of the present invention.

FIG. 8 is a block diagram showing an embodiment of a circuit configuration of a wiper apparatus 212 to which a wiper control method according to the present invention is applied. FIG. 9 is a block diagram showing the function of a CPU 221 employed in the wiper apparatus of FIG. 8. The fundamental configuration thereof is same as that of FIG. 1. Further, parts corresponding to those of FIGS. 2 and 3 are attached with the same reference numerals and they will not be described.

As shown in FIG. 8, the wiper drive control apparatus 212 is comprised of a microcomputer and peripheral circuits thereof. The microcomputer comprises a CPU 221 as a main component, an I/O interface 22, a countermeasure-effect check timer 223a, a DR-side timer 223b, a AS-side timer 223c, a ROM 24, a RAM 25, and a lock determination counter 27, which are connected with each other through a bus line 26.

Here, the measurement effect timer 223a counts an execution duration period of the replacement elimination processing described later, based on a predetermined limit time, if the wiper blades 2a and 2b are locked and stopped. The DR-side timer 223b and the AS-side timer 223c are up-count timers which are reset for every interruption processing of motor pulses of the DR-side and the AS-side, respectively. In addition, the lock determination counter 27 is a counter for counting the number of times for which the replacement elimination processing is carried out in case where the wiper blades 2a and 2b are locked, in order to determine whether the locking state is caused by the replacement or by an obstacle such as a snow cover or the like.

As shown in FIG. 9, the CPU 221 comprises a DR-side position angle calculation means 31a, a AS-side position angle calculation means 31b, a DR-side motor control means 32a, and a AS-side motor control means 32b. In addition, the motor control means 32a and 32b are respectively provided with a DR-side detected angular distance calculation means 33a and a AS-side detected angular distance calculation means 33b as well as a DR-side angle difference data calculation means 34a and a AS-side angle difference data calculation means 34b. Note that the target angular distances are respectively read from maps 36a and 36b in FIGS. 6 and 7.

Further, in the rear stages of the angle difference data calculation means 34a and 34b, there are respectively provided a DR-side motor output calculation means 35a and a AS-side motor output calculation means 35b. Here, after the preceding-following relationship between the wiper blades is determined from the detected angular distance described above, instructions are supplied respectively for the motor drive devices 10a and 10b, based on the angle difference data, such that the difference between the target angular distance and the detected angular distance is reduced. In this case, like in FIG. 3, a DR-side wiper blade measurement speed calculation means 37a, a AS-side wiper blade measurement speed calculation means 37b, a DR-side speed difference data calculation means 38a, and a AS-side speed difference data calculation means 38b may be provided and the wiper control may be carried out by grasping the data concerning the speeds of the wiper blades 2a and 2b.

Meanwhile, discussion will now be made on a case where, under the condition that the wiper blades are controlled based on the angular distance, the wiper arms 6a and 6b are bent due to some external force in the wipe-up process, for example, with the result that information of angular positions of the respective wiper blades in terms of the pulse count represents that both of the wiper blades are placed in the predetermined preceding-following relationship in spite of the fact that the actual positional relationship of the DR-side wiper blade and the AS-side wiper blade are exchanged therebetween. In this case, since the position angles are not changed, the sign of the angle difference coincides with the sign resulting from the predetermined preceding-following relationship, and the motor output calculation means 35a and 35b cannot detect the exchange of the preceding-following relationship between the wiper blades 2a and 2b from the sign. That is, even after the wiper blade in the AS-side which originally is the follower side moves ahead of the DR-side, the leading AS-side still regards itself as the following side. Consequently, the motor output calculation means 35a and 35b make the DR-side move faster than the AS-side in order to make the DR-side move ahead after the change of the preceding-following relationship. Therefore, the DR-side which has been overtaken is driven faster so that the wiper blades contact each other and are locked thereby.

Figure 10:
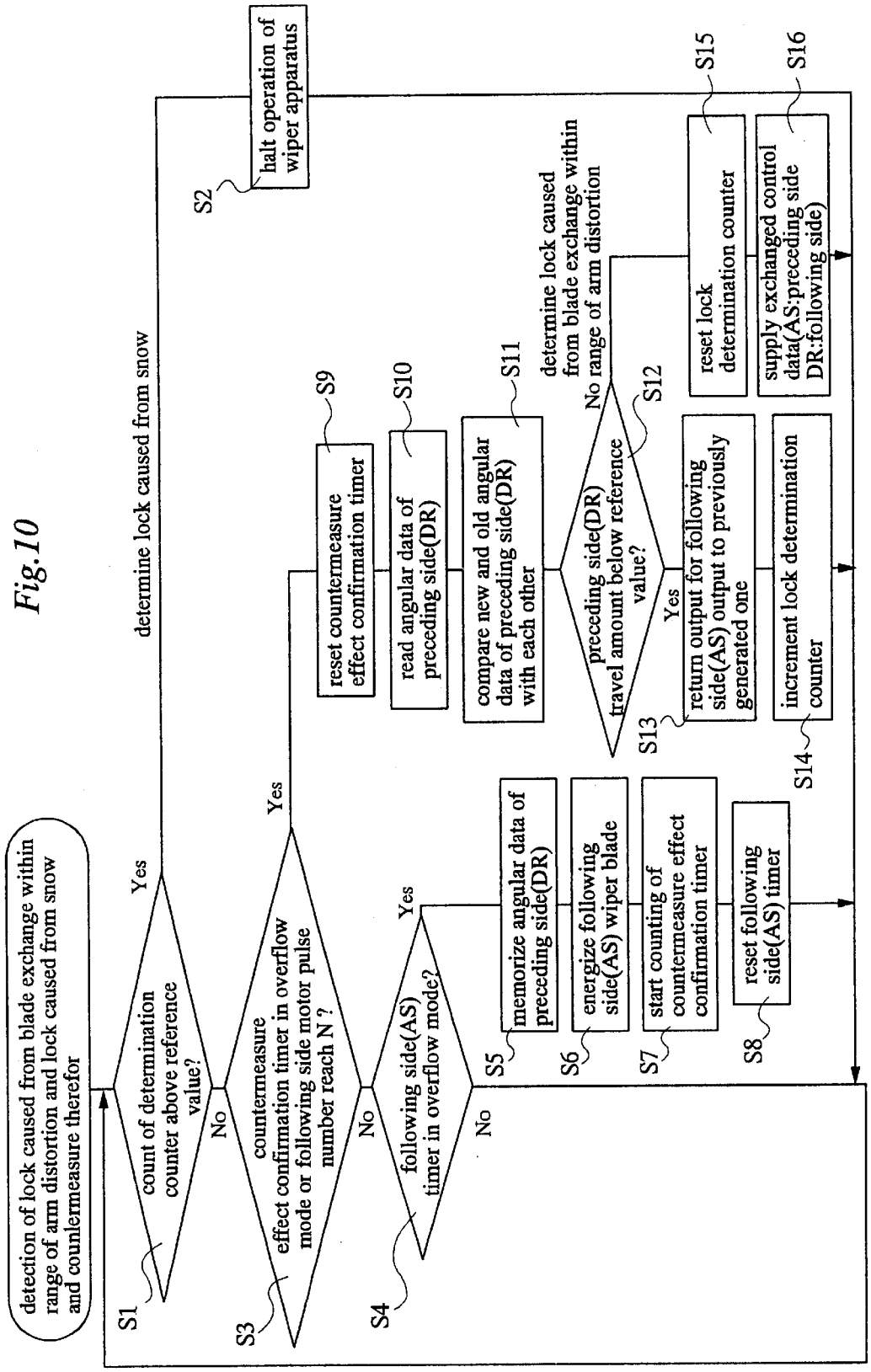
FIG. 10 is a flowchart showing the process for detecting a lock mode taken place in the wiper apparatus and releasing the apparatus from the lock mode.

Therefore, in the present wiper drive control apparatus 212, a lock detection processing means 237 is further provided as shown in FIG. 9 in order to respond to the state of change of the relationship which cannot be recognized by the motor output calculation means 35a and 35b, and any locking state is detected and eliminated if a locking state occurs due to change of the preceding-following relationship or due to covering snow. FIG. 10 is a flowchart showing a procedure of lock detection elimination processing in the lock detection processing means 237. Note that the present processing has been explained with respect to a target of a locking state in the approach routes in FIG. 6. The same processing as shown in FIG. 6 is carried out with the DR-side and the AS-side set as a leader and a follower, respectively, in the return routes.

In the present processing, a locking state is detected by pulses of the motor of the side which is to be positioned in the follower side during normal operation (which will be hereinafter abbreviated as an original follower side or simply as a follower side), and the factor of the locking state is detected. In this case, the state is determined by the motor pulse of the follower side because the wiper arm in tne follower side must operate regardless of the locking state of the side which is to be positioned as a preceding side during normal operation (which will be hereinafter abbreviated as an original preceding side or simply as a preceding side) if the output is increased during normal operation. That is, in the overlapping region where the wiper blades overlap each other, the wiper arm in the follower side is operated with a distance maintained from the wiper arm in the preceding side and therefore can freely move within the distance during normal operation.

According to the present invention, if a locking state is detected, whether the locking state is caused by change of the preceding-following relationship or by an obstacle is determined. If the wiper blades are not moved even after a countermeasure for the change of the preceding-following relationship is made, the locking state is considered as having been caused by an obstacle and the outputs are stopped. At first, as a locking state is detected, the output of the follower side is increased and change of the position angle of the preceding side wiper blade is checked. By this operation, the side which has overtaken escapes under the situation in which the preceding-following relationship between the wiper blades is changed. Further, in this situation, the obstacle is removed and the side which has been overtaken moves together. Therefore, if this escape operation is carried out and if a change of the position angle is found with respect to the wiper blade of the original preceding side, the locking state is determined as having been caused by change of the preceding-following relationship.

Meanwhile, if the control based on the positional angular distance is recovered after increasing the output of the follower side, the wiper blades are going to recover the original preceding-following relationship and are thereby locked again. Therefore, in the present processing, control is performed with the preceding-following relationship changed until the upper return positions after the preceding-following relationship is determined to have been changed. Thus, elimination of a locking state and prevention of recurrence thereof are attempted.

In contrast, if there is no change of the position angle of the wiper blade in the original preceding side even after the output of the original preceding side is increased, the output of the follower side is once returned to the original output and is then increased again. Operation of increasing the output is repeated for several times. Further, if the position angle of the preceding side is not changed even by repeatedly increasing the output, the locking state is determined as having been caused due to a snow cover or the like and the wiper apparatus 1 is stopped.

The processing described above will be specifically explained with reference to FIG. 10. A lock detection processing means 237 firstly determines whether or not a lock determination counter 27 has counted a predetermined reference value or more in a step S1. The lock determination counter 27 is a counter for counting the number of times for which operation of increasing the output of the follower side is carried out. If the preceding side does not move even after the output is thus increased repeatedly, it is determined that a locking state caused by an obstacle. The lock detection processing means 237 refers to the lock determination counter 27 in a step S1. If the counter indicates a count equal to or higher than a reference value, the means 237 considers that a locking state cannot be eliminated even by performing the operation of increasing the output for a predetermined number of times, and also determines that a locking state has occurred due to an obstacle such as a snow cover or due to an excessive load to a glass surface. Further, the lock detection processing means 237 goes to a step S2 to protect the system and issues command for stopping the outputs of the motors 3a and 3b to the motor output calculation means 35a and 35b.

In this state, the drive circuits of the motors 3a and 3b are opened, and therefore, the wiper blades 2a and 2b are returned to the lower return positions due to the weight of a snow cover, in a locking state caused by a snow cover or the like. If the system is rendered down in the step S2, a caution may be given to a driver by means of a pilot lamp or voice. Further, if the wiper operation switch is kept on, re-trial may be carried out after a predetermined time by timer operation.

Meanwhile, if the lock determination counter 27 does not yet count a predetermined reference value, the program goes to operation for eliminating a locking state caused by change of the preceding-following relationship. Here, the state of progress of the procedure for moving the AS-side which is originally to be the follower side is firstly confirmed in the approach routes. Specifically, whether or not the countermeasure effect check timer 223a overflows or whether or not motor pulses equal to a predetermined value or number (N) have been generated in the AS-side (which is the original follower side) is checked.

In this case, the countermeasure effect check timer 223a indicates a limit time in which the motion of the DR-side (or original preceding side) is investigated if a motion of a predetermined angle or less is obtained even though the output of the AS-side is increased. Therefore, if the DR-side does not move, increase of the output of the AS-side is continued for the limit time indicated by the countermeasure effect check timer 223a.

If the countermeasure effect check timer 223a does not overflow and if the motor pulses of the AS-side are less than a reference value in the step S3, the program goes to a step S4 and whether or not the AS-side timer 223c overflows is determined. Here, interruption processing is carried out and the AS-side timer 223c is reset every time when a rotation pulse of the AS-side motor 3b is inputted. Accordingly, overflow of the AS-side timer 223c means that rotation pulses are not inputted from the AS-side motor 3b, i.e., the motor 3b stops. Therefore, when the AS-side timer 223c overflows, the program goes to steps S5 to S8 and processing for increasing the output of the follower side is executed to eliminate a locking state. Note that when the AS-side timer 223c does not overflow, it is determined that the wiper apparatus normally operates and the program returns to the step S1.

In the step S5, the position angle of the wiper blade 2a in the DR-side (which is the original preceding side) is firstly stored in the RAM 25. Thereafter, in the step S6, the output of the motor 3b in the AS-side is increased. In this manner, if the AS-side which is the original follower side comes ahead of the other side due to change of the preceding-following relationship, the AS-side wiper blade 2b is moved to escape and the wiper blade 2b operates, released from a locking state. After increasing the output of the AS-side in the step S6, the countermeasure effect check timer 223c is started in the step S7, and the AS-side timer 223c is reset in the step S8.

Thereafter, the program returns again to the step S1 from the step S8 and the lock determination counter 27 is checked. In this case, since the lock determination has not count up, the program directly goes to the step S2. In the step S2, the countermeasure effect check timer 223a and the number of pulses of the AS-side motor 3b are confirmed. In this case, as a result of increasing the output of the motor 3b, the number of pulses exceeds N since a corresponding number of pulse have been inputted if the AS-side has operated. In contrast, motor pulses are not inputted if the AS-side does not operates. Therefore, the operation from the step S4 to the step S8 is repeated and the output of the AS-side is kept increased, until the countermeasure effect check timer 223a overflows and the limit time is over.

Thus, in the step S3, if the AS-side is operated by increasing the output of the motor 3b, the program goes to the step S9 immediately thereafter. If the AS-side is not operated, the output is continuously increased for a while and the program goes to the step S9 after elapse of the limit time depending on the countermeasure effect check timer 223a.

In the step S9, the countermeasure effect check timer 223a is reset at first. In the step S10, the current position angle of the DR-side (which is the original preceding side) is read. Further, in the step S11, the position angle of the DR-side stored in the step S5 and the position angle read in the step S10 are compared with each other.

In this case, if the locking state is caused by change of the preceding-following relationship between the wiper blades 2a and 2b, the wiper blade 2a is released from the locking state and is operated as the AS-side is operated by increasing the output. Accordingly, the new and old position angles of the DR-side are compared with each other. If the DR-side moves more than the predetermined reference value beyond a fine motion range in accordance with increase of the output of the AS-side, it can be determined that the locking state is caused by change of the preceding-following relationship. In contrast, if the DR-side does not operate regardless of having increased the output of the AS-side, it can be determined that both sides are locked due to an obstacle such as a snow cover or the like.

Therefore, in the step S12, to identify the factor of the locking state, whether or not the difference between the new and old DR-side position angles, which is the movement amount in the DR-side, is equal to or smaller than a predetermined reference value is determined. Further, if the movement amount is equal to or smaller than the reference value, the programs goes to the step S13 and the output of the AS-side is returned to the original value. The lock determination counter 27 is then let count up in the step S14. The program goes to the step S2 form the step S1. In the step S2, since the countermeasure effect check timer 223a has already been reset, the program goes toward the step S4. At this time, since the AS-side has not yet been operated, the AS-timer 223c overflows. Therefore, the processing of the steps S5 to S8 is carried out. Thereafter, if the countermeasure effect check timer 223a overflows, the processing goes to the step S9 from the step S2 and the processing of the steps S9 to S14 is carried out. That is, if no movement in the DR-side has been identified, a flow of increase, reset, and increase of the output of the AS-side is repeated for a plurality of times. Further, every time when increase of the output is repeated, the lock determination counter 27 is let count up. If the DR-side does not operate even by repeating the flow for a predetermined reference number of times (e.g., two to four times), the program goes to the step S2 from the step S1 and the output is stopped.

Meanwhile, if it is confirmed that the movement amount in the DR-side exceeds the reference value in the step S12, it is determined that change of the preceding-following relationship between the wiper blades 2a and 2b has been changed, and the program goes to steps S15 and S16. At this time, in the step S15, the lock determination counter 27 is reset prior to starting of elimination processing for a locking state, and the program goes to the step S16. In the step S16, to prevent the wiper blades from being locked again by the position angle control described above, the apparatus is operated with the control forms for the DR-side and the AS-side replaced with each other. That is, the DR-side which should be the original preceding side is controlled on the basis of the AS-side target angular distance reference table 36b for the follower side, and the AS-side which should be the original follower side is controlled on the basis of the DR-side target angular distance reference table 36a for the preceding side. Accordingly, the DR-side motor output calculation means 35a obtains angle difference data from the AS-side angle difference data calculation means 34b, and determines the output of the DR-side motor 3a, based on the obtained data. In addition, the AS-side motor output calculation means 35b obtains angle difference data from the DR-side angle difference data calculation means 34a, and determines the output of the AS-side motor 3b, based on the obtained data.

Therefore, until the wiper blades reaches the upper return positions, the AS-side which has been overtaken and has become the preceding side is driven as the preceding side, and the DR-side (which is originally the preceding side) which has become the follower side is driven to follow the AS-side such that a predetermined positional angular distance is maintained. Further, the original control forms are recovered at the upper return positions. In this manner, the wiper blades 2a and 2b which have been locked due to change of the preceding-following relationship are unlocked and start moving again. After the wiper blades reach the upper return positions, normal operation of the wiper blades is recovered. In addition, after starting the operation, it is possible to avoid a situation that the wiper blades are brought into contact with each other again and locked.

In the replacement control in the step S16, if the preceding-following relationship between the wiper blades is changed in the return routes, the control forms for the DR-side and the AS-side are replaced with each other through the lower return positions after the change. This is because control is performed to make the DR-side lead if the original control forms are recovered and the wiper blades are locked in the lower return positions. Also, if the preceding-following relationship is changed again due to some factor and the regular preceding-following relationship is recovered after the preceding-following relationship is changed and the control forms are replaced, the original control forms are recovered and the wiper blades are driven under normal control forms.

Thus, according to the present embodiment, the output of the follower side is increased and the condition of the preceding side is checked, when a locking state of the wiper blades is detected by overflow of the timer of the follower side. Therefore, even if the left and right wiper blades are locked due to change of the preceding-following relationship or due to an obstacle, the locking state and the factor thereof are consciously detected so that processing for elimination thereof can be performed. In particular, even if the preceding-following relationship between the left and right wiper blades is changed due to bending of a mechanical part without causing changes of the position angles, a locking state is caused by change of the preceding-following relationship can be consciously identified, so that elimination processing thereof can be performed.

In addition, explanation will be made of a system as a third embodiment of the present invention. In this embodiment, if the wiper blade of the preceding side is stopped due to a load by utilizing the provision of two motors respectively in the left and right sides, the wiper blade of the follower side assists the other blade in a predetermined wiping region so that the outputs from the two motors respond together to the load.

Figure 11:
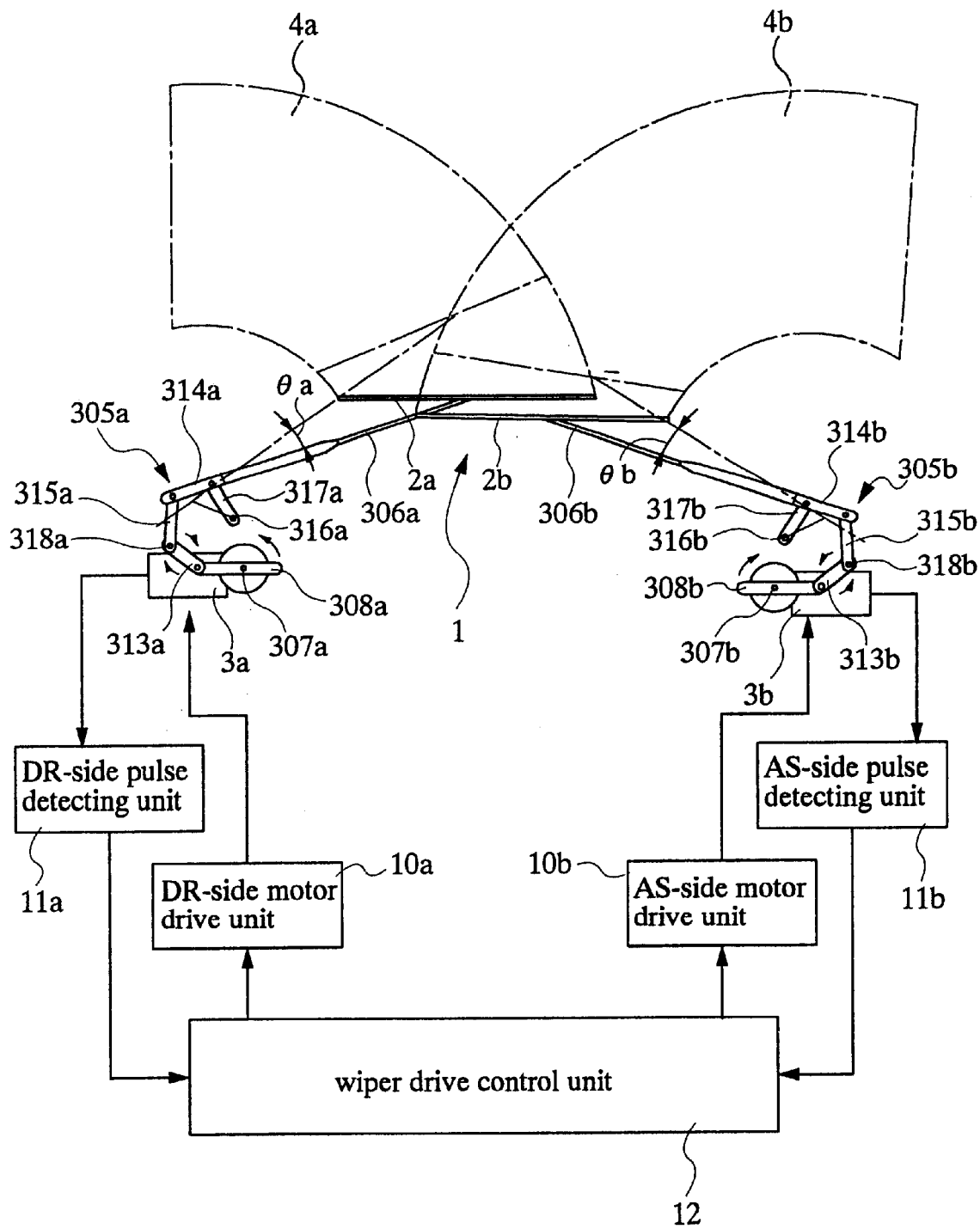
FIG. 11 is a schematic illustration of the structure of an opposed type wiper apparatus to which the present invention can be applied.
Figure 12:
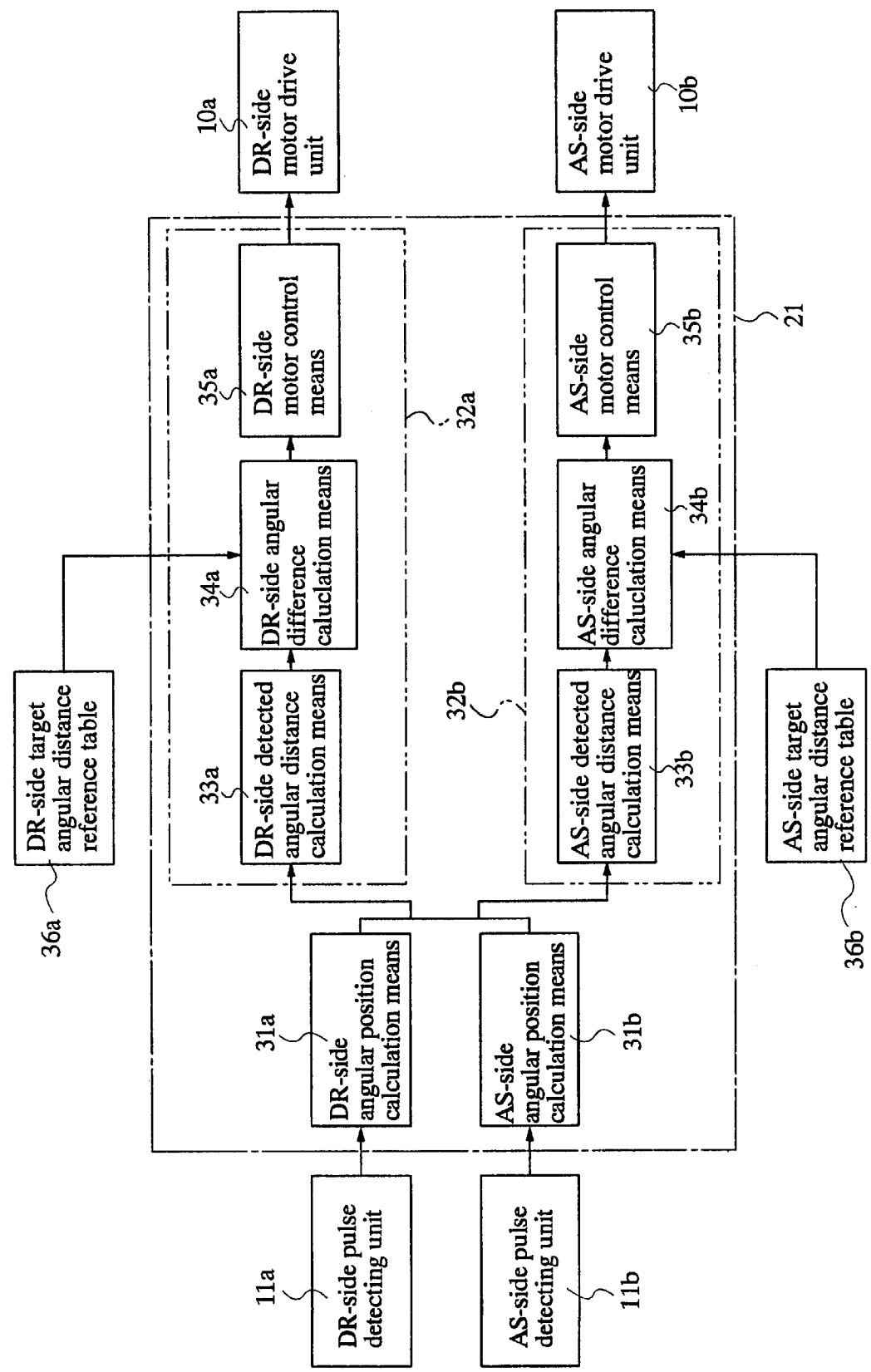
FIG. 12 is a block diagram of a CPU employed in an opposed type wiper apparatus to which the present invention can be applied.

FIG. 11 is an illustration showing the structure of an opposed wiping type wiper apparatus according to the present embodiment and the schematic control system thereof. FIG. 12 is a block diagram showing the structure of the main function of the CPU 321 used in the embodiment. The circuit configuration of the wiper drive control apparatus 312 is the same as that shown in FIG. 2. Those of the other components of this apparatus that are the same as described before will be denoted at the same reference symbols, and explanation of those components will be omitted herefrom.

In the present embodiment, as shown in FIG. 11, the wiper blades 2a and 2b are supported by the wiper arms 306a and 306b which swing laterally by means of four-joint link mechanisms 305a and 305b. These four-joint link mechanisms 305a and 305b use a known wiper drive apparatus and have respectively crank arms, connection rods 308a and 308b, and swing arms 313a and 313b. The crank arms are respectively attached to output shafts 307a and 307b of motors 3a and 3b which are rotated in accordance with rotations of the motors 3a and 3b. The connection rods 308a and 308b are rotatably connected to the top ends of the crank arms. The swing arms 313a and 313b respectively have ends rotatably connected to the top ends of the connection rods 308a and 308b and other ends pivoted on pivot shafts 318a and 318b rotatably secured to the body of a vehicle.

Meanwhile, arm heads 314a and 314b are integrally attached to the rear ends of the wiper arms 306a and 306b, respectively, and the rear end portions of the heads are respectively connected with first swing arms 315a and 315b such that these portions and arms rotate integrally in accordance with the reciprocal motions of the swing arms 313a and 313b. In addition, the arm heads 314a and 314b are respectively connected with second swing arms 317a and 317b having ends rotatably secured to pivot shafts 316a and 316b of the body of the vehicle.

Further, as the motors 3a and 3b are rotation in one direction, the crank arms are rotated and the rotations thereof are converted into reciprocal motions of the connection rods 308a and 308b. Accordingly, the swing arms 313a and 313b reciprocally swing so that the pivot shafts 318a and 318b reciprocally rotate. Further, as the swing arms 313a and 313b reciprocally swing, the wiper blades 2a and 2b perform different wiping by relative motions of the arm heads 314a and 314b, the first swing arms 318a and 318b, and the second swing arms 317a and 317b, with the pivot shafts 316a and 316b and the pivot shafts 318a and 318b functioning as fulcrums.

The wiping regions 4a and 4b of the wiper blades 2a and 2b can be appropriately modified, depending on the lengths of components of the four-like mechanisms 305a and 305b and the positions of fulcrums. For example, the wiper blades may move laterally in parallel from the lower return positions at first and may then rotate.

The CPU 321 has a DR-side position angle calculation means 31a and a AS-side position angle calculation means 31b, and a DR-side motor control means 32a and a AS-side motor control means 32b. Also, the motor control means 32a and 32b are respectively provided with a DR-side detected angular distance calculation means 33a and a AS-side detected angular distance calculation means 33b, as well as a DR-side angle difference data calculation means 34a and a AS-side angle difference data calculation means 34b. Note that the target angular distances are respectively read from the maps 36a and 36b shown in FIGS. 6 and 7.

Further, in the rear stages of the angle difference data calculation means 34a and 34b, there are provided a DR-side motor output calculation means 35a and a AS-side motor output calculation means 35b. Here, these means supply instructions to the motor drive devices 10a and 10b on the basis of the angle difference data such that the target angular distance and the detected angular distance is reduced. In this case, like in FIG. 3, a DR-side wiper blade measurement speed calculation means 37a and a AS-side wiper blade measurement speed calculation means 37b as well as a DR-side speed difference data calculation means 38a and a AS-side speed difference data calculation means 38b may be provided, and wiper control may be carried out while grasping data concerning the speeds of the wiper blades 2a and 2b. Also, a lock detection processing means 237 can be provided to add the processing as described before.

Meanwhile, under control based on the position angles, the AS-side follows the DR-side with a predetermined distance maintained therebetween in the approach routes of the wiper motions. Therefore, if the DR-side does not operate due to a snow cover or the like when starting the wiper apparatus, the AS-side does not operate either. If the DR-side stops halfway, the AS-side merely stands by with a predetermined positional angular distance maintained. Therefore, as long as the positional angular distance control as described above is carried out, it is necessary to respond to the load of the snow cover or the like, with only the output of the motor 3a of the DR-side.

In contrast, in the wiper control method according to the present invention, the motor 3b in the AS-side is used to respond to a load with use of both motors, in consideration of respectively providing motors in the DR-side and the AS-side. That is, within a predetermined range of the region where the wiping region 4a of the DR-side and the wiping region 4b of the AS-side overlap each other, control is performed such that the wiper blade 2b of the AS-side pushes and moves the other wiper blade when the wiper arm 2a is stopped by the load.

The CPU 321 measures the time per position angle together with the position angles of the wiper blades 2a and 2b, by the timer 23. Further, if the position angle of the wiper blade is changed even by driving the wiper blade 2a of the DR-side and if this condition continues for a predetermined time (e.g., 5 seconds) or more, it is determined that the motion of the wiper blade 2a is hindered by a load of a snow cover or the like. FIG. 13(a) is an illustration showing a state of the wiper blades 2a and 2b at this time.

In the wiper control method according to the present invention, at this time, the CPU 321 assists the wiper blade 2a by the wiper blade 2b positioned in the lower side, with the output of the motor 3b maximized regardless of the positional angular distance. In this case, the assistance of the wiper blade 2b is effected within the range of a common work region 309 indicated in FIG. 13(a) where both the wiping regions 4a and 4b overlap each other so that the assistance of the wiper arms is achieved effectively. At this time, the output of the motor 3a of the wiper blade 2a is also maximized.

In this manner, the wiper blade 2a is pushed up from downside by the wiper blade 2b, as shown in FIG. 13(b), so that the load hindering the motion of the wiper blade 2a is responded to by the outputs of two motors. Accordingly, such a load which cannot be overcome with the output of only one motor but can be overcome with the outputs of two motors can be cleared in this manner. In addition, even in case of a structure which is difficult to output a starting torque like a four-joint link mechanism, it is possible to respond to a load by means of two motors, and therefore, the driving force against a load can be increased at starting of the apparatus. If the position angle of the wiper blade 2a does not change even by using two motors to respond to a load, it is determined that the load is excessively large and the motor output is turned off to prevent burn-out of the motor.

Thus, the present embodiment utilizes provision of two respective motors in the left and right sides. If the wiper blade in the preceding side is stopped by a load, the wiper blade in the follower side assists the wiper blade in the preceding side, within a predetermined wiping region. It is therefore possible to respond to a load with use of outputs of two motors. Accordingly, such a load which cannot be overcome with an output of one motor can be overcome by cooperative work of two motors.

Detailed description has hereinabove been given of the invention achieved by the present inventor with reference to the embodiment. However, the present invention should not be limited to the embodiment described above, and various modification can be effected without departing from the gist of the invention, and all such variations shall be embraced within the scope of the invention.

What is claimed is:

1. A method for controlling an opposed wiping type wiper apparatus having first and second wiper blades driven by respective motors, each wiper blade being controlled so that wiping areas of the respective wiper blades contain area overlapping with each other and that respective wiper blades are controlled based on a predetermined preceding-following relationship between the wiper blades, the method comprising the steps of:

energizing the motor of the wiper blade which shall be on the following side in terms of the predetermined preceding-following relationship to move the wiper blade in the direction from the following side to the preceding side when the wiper blades cease motion upon driving mode of the wiper apparatus;

energizing the motor of the wiper blade which shall be on the preceding side in terms of the predetermined preceding-following relationship to move the wiper blade in the direction from the following side to the preceding side;

detecting whether or not the wiper blade which shall be on the preceding side in terms of the predetermined preceding-following relationship is moved in response to the energizing step; and controlling the first and second wiper blades based on a preceding-following relationship in which roles of the first and second wiper blades are exchanged with each other if the wiper blade which shall be on the preceding side in terms of the predetermined preceding-following relationship is moved, and wherein each of the motors is connected with a timer which is arranged to be reset by a pulse signal generated in association with rotation of the corresponding motor, and when a timer connected to the motor driving the wiper blade which is to be on the follower side in terms of the predetermined preceding-following relationship is not reset but brought into a mode of overflow, the step for energizing the wiper blade which shall be on the following side in terms of the predetermined preceding-following relationship to move in the direction toward the preceding side, is carried out.

2. A method for controlling an opposed wiping type wiper apparatus having first and second wiper blades driven by respective motors, each wiper blade being controlled so that wiping areas of the respective wiper blades contain area overlapping with each other and that each one wiper blade is controlled based on a predetermined preceding-following relationship between the wiper blades, wherein if the wiper blade which shall be on the preceding side in terms of the predetermined preceding-following relationship ceases to operate for a predetermined time duration within the area where wiping areas of the wiper blades overlap each other, then the wiper blade on the follower side in terms of the predetermined preceding-following relationship is driven to urge the wiper blade on the preceding side upward.

3. An opposed wiping type wiper apparatus having first and second wiper blades driven by respective motors, each wiper blade being controlled so that wiping areas of the respective wiper blades contain area overlapping with each other and that each one wiper blade is controlled based on a predetermined preceding-following relationship between the wiper blades, the apparatus comprising:

first detecting means for detecting whether or not the wiper blades cease motion upon driving mode of the wiper apparatus;

second detecting means for detecting whether or not the wiper blade which shall be on the preceding side in terms of the predetermined preceding-following relationship is moved; and control means for controlling the respective motors to control the motion of the wiper blades; wherein when the first detecting means detects the wiper blades cease motion upon driving mode of the wiper apparatus, the control means energizes the motor of the wiper blade which shall be on the following side in terms of the predetermined preceding-following relationship to move the wiper blade in the direction from the following side to the preceding side and also energizes the motor of the wiper blade which shall be on the preceding side in terms of the predetermined preceding-following relationship to move the wiper blade in the direction from the following side to the preceding side, and if the second detecting means detects that the wiper blade which shall be on the preceding side in terms of the predetermined preceding-following relationship is moved, then the control means controls the first and second wiper blades based on a preceding-following relationship in which roles of the first and second wiper blades are exchanged with each other.

4. An opposed wiping type wiper apparatus having first and second wiper blades driven by respective motors by way of a link mechanism, each wiper blade being controlled so that wiping areas of the respective wiper blades contain area overlapping with each other and that each one wiper blade is controlled based on a predetermined preceding-following relationship between the wiper blades, the apparatus comprising:

first detecting means for detecting whether or not the wiper blades cease motion for a predetermined time duration upon driving mode of the wiper apparatus;

second detecting means for detecting whether or not the wiper blades lie in the area in which the wiping areas of the respective wiper blades overlap with each other; and control means for controlling the respective motors to control the motion of the wiper blades; wherein if the first detecting means detects that the wiper blade which shall be on the preceding side in terms of the predetermined preceding-following relationship ceases motion for a predetermined time duration and the second detecting means detects that the wiper blades lie in the area in which the wiping areas of the respective wiper blades overlap with each other, then the control means energizes the wiper blade on the follower side to urge the wiper blade on the preceding side upward.

5. Apparatus according to claim 4, wherein the link mechanism is a four-joint link mechanism.

6. A method for controlling an opposed wiping type wiper apparatus having first and second wiper blades driven by respective motors, each wiper blade being controlled so that wiping areas of the respective wiper blades contain area overlapping with each other and that respective wiper blades are controlled based on a predetermined preceding-following relationship between the wiper blades, the method comprising the steps of:

energizing the motor of the wiper blade which shall be on the following side in terms of the predetermined preceding-following relationship to move the wiper blade in the direction from the following side to the preceding side when the wiper blades cease motion upon driving mode of the wiper apparatus;

energizing the motor of the wiper blade which shall be on the preceding side in terms of the predetermined preceding-following relationship to move the wiper blade in the direction from the following side to the preceding side;

detecting whether or not the wiper blade which shall be on the preceding side in terms of the predetermined preceding-following relationship is moved in response to the energizing step; and controlling the first and second wiper blades based on a preceding-following relationship in which roles of the first and second wiper blades are exchanged with each other if the wiper blade which shall be on the preceding side in terms of the predetermined preceding-following relationship is moved, and wherein if the wiper blade which shall be on the preceding side in terms of the predetermined preceding-following relationship, is not moved in response to the execution of the corresponding energizing step, the motor is returned to a drive mode which is effected before the energizing step is carried out, and then the energizing step is executed again.

7. A method according to claim 6, wherein if the wiper blade which shall be on the preceding side in terms of the predetermined preceding-following relationship, is not moved in spite of the trials by a predetermined times, the each of the motor ceases to operate.

* * * * *